US009645435B2

(12) United States Patent
Kim et al.

(10) Patent No.: US 9,645,435 B2
(45) Date of Patent: May 9, 2017

(54) LIQUID CRYSTAL DISPLAY

(71) Applicant: Samsung Display Co., Ltd., Yongin, Gyeonggi-Do (KR)

(72) Inventors: Hyun Wuk Kim, Yongin-si (KR); Sung Jin Hong, Seoul (KR); Sung In Ro, Hwaseong-si (KR); Ock Soo Son, Seoul (KR); Eun Je Jang, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 135 days.

(21) Appl. No.: 14/246,523

(22) Filed: Apr. 7, 2014

(65) Prior Publication Data
US 2015/0146143 A1 May 28, 2015

(30) Foreign Application Priority Data

Nov. 27, 2013 (KR) .......................... 10-2013-0145118

(51) Int. Cl.
G02F 1/1362 (2006.01)
G02F 1/1368 (2006.01)
G02F 1/1335 (2006.01)
G02F 1/1343 (2006.01)

(52) U.S. Cl.
CPC .. G02F 1/133512 (2013.01); G02F 1/134363 (2013.01); G02F 1/136209 (2013.01); G02F 2001/134372 (2013.01)

(58) Field of Classification Search
CPC ............. G02F 1/133512; G02F 1/1368; G02F 1/136209; H01L 27/124

USPC ....................... 349/42, 43, 46, 110
See application file for complete search history.

(56) References Cited

U.S. PATENT DOCUMENTS

| 5,708,485 | A | * | 1/1998 | Sato | .................. | G02F 1/136209 349/110 |
| 6,320,221 | B1 | * | 11/2001 | Choi | ..................... | G02F 1/1368 257/329 |
| 7,405,783 | B2 | | 7/2008 | Aoki et al. | | |
| 7,554,630 | B2 | | 6/2009 | Kwon et al. | | |
| 7,773,177 | B2 | * | 8/2010 | Park | .................. | G02F 1/133512 349/110 |
| 8,139,176 | B2 | | 3/2012 | Lee et al. | | |

(Continued)

FOREIGN PATENT DOCUMENTS

| JP | 10-293296 A | 11/1998 |
| JP | 4131520 B2 | 6/2008 |

(Continued)

*Primary Examiner* — Paul Lee
*Assistant Examiner* — Jia Pan
(74) *Attorney, Agent, or Firm* — Cantor Colburn LLP

(57) ABSTRACT

A liquid crystal display includes a display panel including a plurality of pixels, a first substrate and a second substrate facing each other, a liquid crystal layer disposed between the first substrate and the second substrate, a first electrode which is disposed on the first substrate and transmits a first voltage, a second electrode which is disposed on the first substrate and transmits a second voltage, and a light blocking member overlapping a space between a side of the first electrode and a side of the second electrode which face each other, where the light blocking member has an island shape within a region of a pixel of the plurality of pixels in a plan view.

20 Claims, 28 Drawing Sheets

(56) References Cited

U.S. PATENT DOCUMENTS

| | | | |
|---|---|---|---|
| 8,242,507 B2* | 8/2012 | Chang | H01L 27/124 |
| | | | 257/249 |
| 2001/0050368 A1* | 12/2001 | Moon | G02F 1/1368 |
| | | | 257/72 |
| 2005/0243235 A1* | 11/2005 | Lee | G02F 1/13394 |
| | | | 349/44 |
| 2010/0044708 A1* | 2/2010 | Lin | H01L 29/41733 |
| | | | 257/59 |
| 2012/0249940 A1* | 10/2012 | Choi | G02F 1/133753 |
| | | | 349/123 |
| 2013/0087794 A1* | 4/2013 | Kwack | H01L 27/1288 |
| | | | 257/59 |

FOREIGN PATENT DOCUMENTS

| KR | 100622396 B1 | 9/2006 |
|---|---|---|
| KR | 100640048 B1 | 10/2006 |
| KR | 100702390 B1 | 3/2007 |
| KR | 1020110044108 A | 4/2011 |

\* cited by examiner

LIQUID CRYSTAL DISPLAY

This application claims priority to Korean Patent Application No. 10-2013-0145118, filed on Nov. 27, 2013, and all the benefits accruing therefrom under 35 U.S.C. §119, the entire contents of which are incorporated herein by reference.

BACKGROUND (a) Field

The invention relates to a liquid crystal display ("LCD"), and particularly, relates to an LCD including a light blocking member.

(b) Description of the Related Art

A liquid crystal display ("LCD") device, which is one of the most common types of flat panel displays currently in use, includes two panel sheets with field generating electrodes, and a liquid crystal layer interposed therebetween. The LCD rearranges liquid crystal molecules of the liquid crystal layer by applying a voltage to the field generating electrodes to control an amount of transmitted light, thereby displaying a desired image.

The field generating electrodes may be provided in two panels facing each other, and two field generating electrodes may be positioned on one panel. A pixel electrode receiving a data voltage of the field generating electrodes and a plurality of thin film transistors ("TFTs") are arranged in a matrix form on one panel of the two panels facing each other, and color filters expressing primary colors such as red, green, and blue, for example, and a light blocking member capable of preventing light leakage between pixels may be formed on the other panel.

However, in such a liquid crystal display, since the pixel electrode and the TFT, and the color filter or the light blocking member, are formed on the different panels, it is difficult to perform exact alignment between the pixel electrode and the color filter or between the pixel electrode and the light blocking member, and as a result, an alignment error may occur.

In order to solve the alignment error, a structure in which the light blocking member is formed on the same panel as the pixel electrode and the TFT is provided, and in this case, the color filter may also be formed on the same panel as the pixel electrode. As such, by forming the light blocking member on the panel with the pixel electrode and the TFT together, a high aperture ratio and high transmittance of the LCD may be achieved.

SUMMARY

In a structure in which a light blocking member is disposed on the same panel as a pixel electrode and a thin film transistor ("TFT"), an impurity is injected into a liquid crystal layer from the light blocking member, and as result, an afterimage is generated and reliability of a liquid crystal display ("LCD") may be deteriorated.

Therefore, the invention has been made in an effort to provide an LCD having advantages of removing an afterimage of the LCD and enhancing reliability by preventing an impurity from flowing into a liquid crystal layer from a light blocking member, in the case where the light blocking member is disposed in the same panel as a pixel electrode and a TFT.

The invention prevents light leakage by a minimal light blocking member.

An LCD according to an exemplary embodiment of the invention includes a display panel including a plurality of pixels, a first substrate and a second substrate facing each other, a liquid crystal layer disposed between the first substrate and the second substrate, a first electrode that is disposed on the first substrate and transmits a first voltage, a second electrode that is disposed on the first substrate and transmits a second voltage, and a light blocking member overlapping a space between a side of the first electrode and a side of the second electrode that face each other, where the light blocking member has an island shape within a region of a pixel of the plurality of pixels in a plan view.

In an exemplary embodiment, the first electrode may include a gate line that transmits a gate signal, and the second electrode includes a drain electrode that receives a data voltage, or a pixel electrode connected to the drain electrode.

In an exemplary embodiment, a recess portion may be defined in the gate line, the drain electrode may include an expansion disposed in the recess portion, and the pixel electrode may include a protrusion electrically connected to the expansion.

In an exemplary embodiment, the light blocking member may include a first light blocking member portion overlapping a space between an edge side of the recess portion and a side of the expansion that face each other or between the edge side of the recess portion and a side of the protrusion that face each other.

In an exemplary embodiment, a source electrode facing the drain electrode and disposed in a same layer as the drain electrode may be further included, the drain electrode may further include a bar portion facing the source electrode and a connection that connects the bar portion and the expansion, the light blocking member may further include a second light blocking member portion facing the first light blocking member portion via the connection interposed therebetween, and the second light blocking member portion may overlap a space between the edge side of the recess portion and the side of the expansion that face each other or between the edge side of the recess portion and the side of the protrusion that face each other.

In an exemplary embodiment, the first light blocking member portion and the second light blocking member portion may be connected to each other.

In an exemplary embodiment, the light blocking member may be disposed between the pixel electrode and the liquid crystal layer.

In an exemplary embodiment, the light blocking member may be disposed between the pixel electrode and the first substrate.

In an exemplary embodiment, the light blocking member may be disposed on the second substrate.

In an exemplary embodiment, the light blocking member may overlap a space between the edge side of the recess portion and the side of the expansion that face each other or between the edge side of the recess portion and the side of the protrusion that face each other, and may overlap the expansion.

In an exemplary embodiment, an opening may be defined at a center of the light blocking member and overlap the expansion.

In an exemplary embodiment, a plurality of signal lines extending between the plurality of pixels may be further included, and the plurality of signal lines may include a non-transparent conductive material.

In an exemplary embodiment, an opposing electrode that receives a common voltage and generates an electric field in the liquid crystal layer along with the pixel electrode may be further included, and the opposing electrode may be disposed on the first substrate.

In an exemplary embodiment, an opening may be defined in the opposing electrode and surround the protrusion, and the light blocking member may include a portion overlapping a space between an edge side of the opening and the edge side of the expansion that face each other or between an edge side of the opening and the edge side of the protrusion that face each other.

In an exemplary embodiment, the light blocking member may include a portion overlapping a space between an edge side of the gate line and a side of the drain electrode that face each other or between an edge side of the gate line and a side of the pixel electrode that face each other.

In an exemplary embodiment, the gate line may include a gate electrode protruding upwardly or downwardly in a plan view, and the light blocking member may include a portion overlapping a space between an edge side of the gate electrode and a side of the drain electrode or between the edge side of the gate electrode and a side of the pixel electrode that face each other.

According to an exemplary embodiment of the invention, in the LCD in which the light blocking member is disposed at the same display panel as the pixel electrode and the TFT, the impurity from the light blocking member is prevented from being flowed into the liquid crystal layer such that afterimages of the LCD may be effectively reduced and reliability may be increased. Also, the minimum light blocking member may effectively prevent light leakage.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
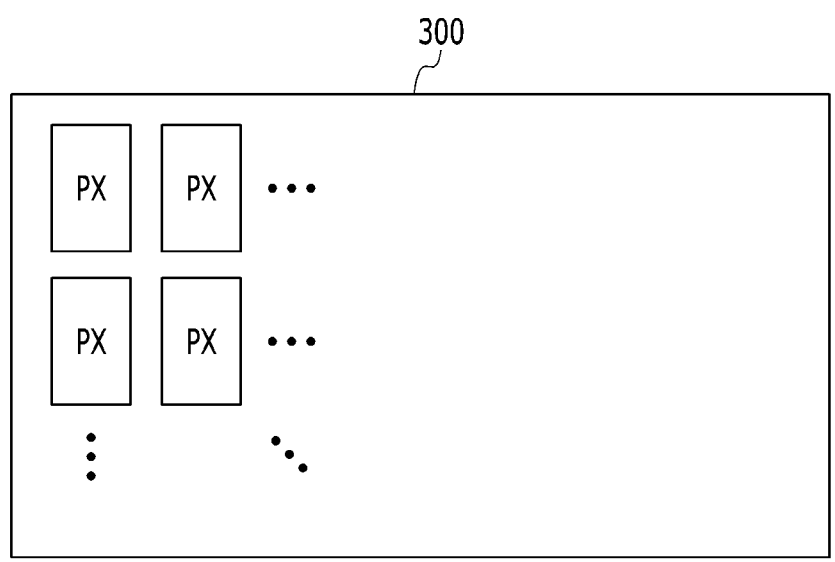
FIG. 1 is a plan view of an exemplary embodiment of a liquid crystal display ("LCD") according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Now, a liquid crystal display ("LCD") according to an exemplary embodiment of the invention will be described with reference to accompanying drawings.

Firstly, an LCD according to an exemplary embodiment of the invention will be described with reference to FIGS. 1 to 3.

Figure 2:
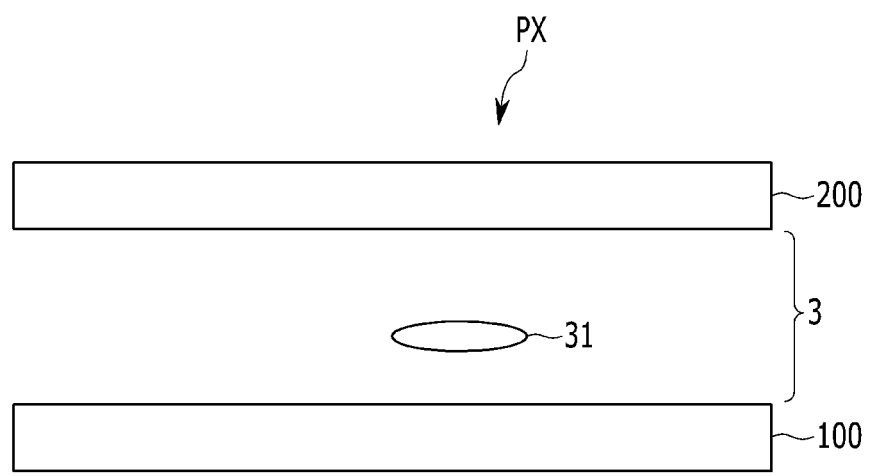
FIG. 2 is a cross-sectional view of an exemplary embodiment of an LCD according to the invention.
Figure 3:
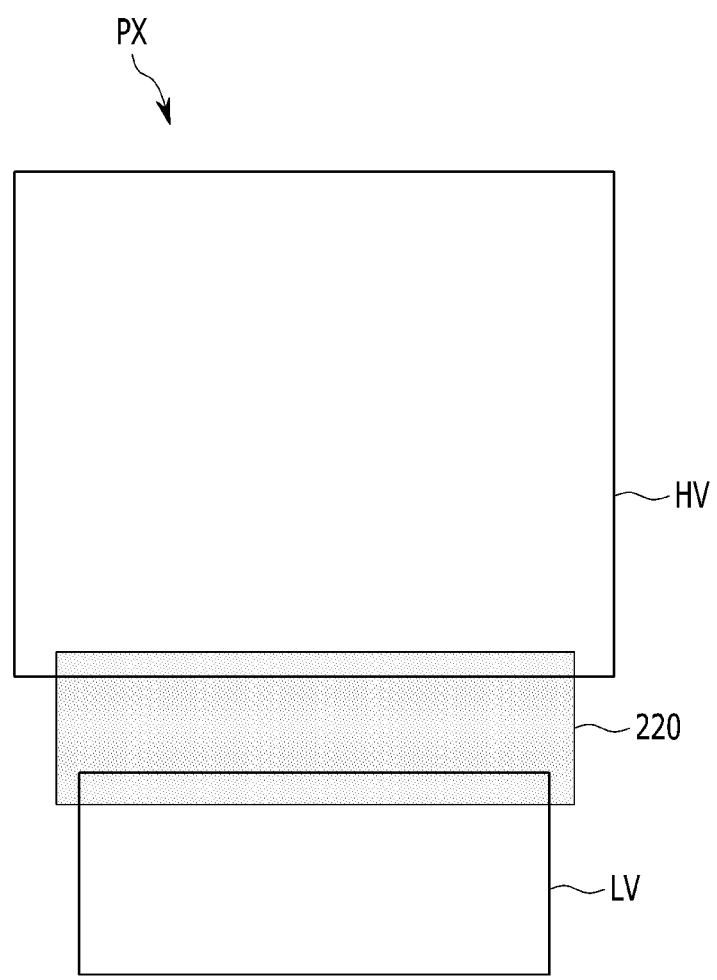
FIG. 3 is a plan view of a pixel of an exemplary embodiment of an LCD according to the invention.

FIG. 1 is a plan view of an LCD according to an exemplary embodiment of the invention, FIG. 2 is a cross-sectional view of an LCD according to an exemplary embodiment of the invention, and FIG. 3 is a plan view of a pixel of an LCD according to an exemplary embodiment of the invention.

Referring to FIG. 1, an LCD according to an exemplary embodiment of the invention includes a display panel 300 in which a plurality of pixels PX is positioned. Each pixel PX as a unit displaying an image may display the image of a predetermined luminance. Signal lines (not shown) such as a gate line and a data line may extend between the pixels PX, and the signal lines may include a non-transparent conductive material. In an exemplary embodiment, the signal lines may include a conductive material having low reflectance.

Referring to FIG. 2, the display panel 300 of the LCD according to an exemplary embodiment of the invention includes a lower panel 100 and an upper panel 200 facing each other, and a liquid crystal layer 3 interposed therebetween. The liquid crystal layer 3 includes liquid crystal molecules 31. At least one field generating electrode (not shown) generating an electric field to the liquid crystal layer 3 is positioned in the lower panel 100 and/or the upper panel 200. The liquid crystal molecules 31 are aligned in a predetermined direction and then may be rearranged according to the electric field generated in the liquid crystal layer 3.

Referring to FIG. 3, one pixel PX includes a first electrode HV, a second electrode LV, and an island light blocking member 220.

The first electrode HV may be applied with a predetermined first voltage and the second electrode LV may be applied with a second voltage. The first voltage and the second voltage as a separate voltage may have different magnitudes. In an exemplary embodiment, the second voltage may be smaller than the first voltage, for example.

The first electrode HV and the second electrode LV may be positioned together at one of the lower panel 100 and the upper panel 200.

In an exemplary embodiment of the invention, an edge side of the first electrode HV includes a portion facing an edge side of the second electrode LV, and a space between the side of the first electrode HV and the side of the second electrode LV is covered by the island light blocking member 220. The island light blocking member 220 may be an approximate island corresponding to the pixel PX, and the shape thereof may be various. The island light blocking member 220 may overlap at least a portion of the side of the first electrode HV or the side of the second electrode LV facing each other. FIG. 3 shows an exemplary embodiment in which the island light blocking member 220 overlaps the side of the first electrode HV and the side of the second electrode LV.

The island light blocking member 220 may be positioned at the lower panel 100 and/or the upper panel 200.

A fringe field of a horizontal direction may be generated by a voltage difference of the first electrode HV and the second electrode LV between the side of the first electrode HV and the side of the second electrode LV, and this affects the arrangement of the liquid crystal molecules 31 thereby resulting in light leakage of an undesired luminance. The light leakage may be blocked by the island light blocking member 220 so as not to be recognized by a viewer. Also, in an exemplary embodiment of the invention, since the light blocking member is not disposed on the entire display panel 300 but the island light blocking member 220 is selectively provided only at the region for preventing the light leakage, usage of a light blocking material may be limited and the liquid crystal layer 3 may be maximally prevented from being contaminated by the light blocking material.

In addition, a formation area of the light blocking member 220 may be reduced such that the region where the light is unnecessary blocked may be minimized, and an aperture ratio may be increased in the LCD with high resolution.

Next, a detailed structure of the LCD according to an exemplary embodiment of the invention will be described with reference to FIGS. 4 to 8 as well as the described drawings.

Figure 4:
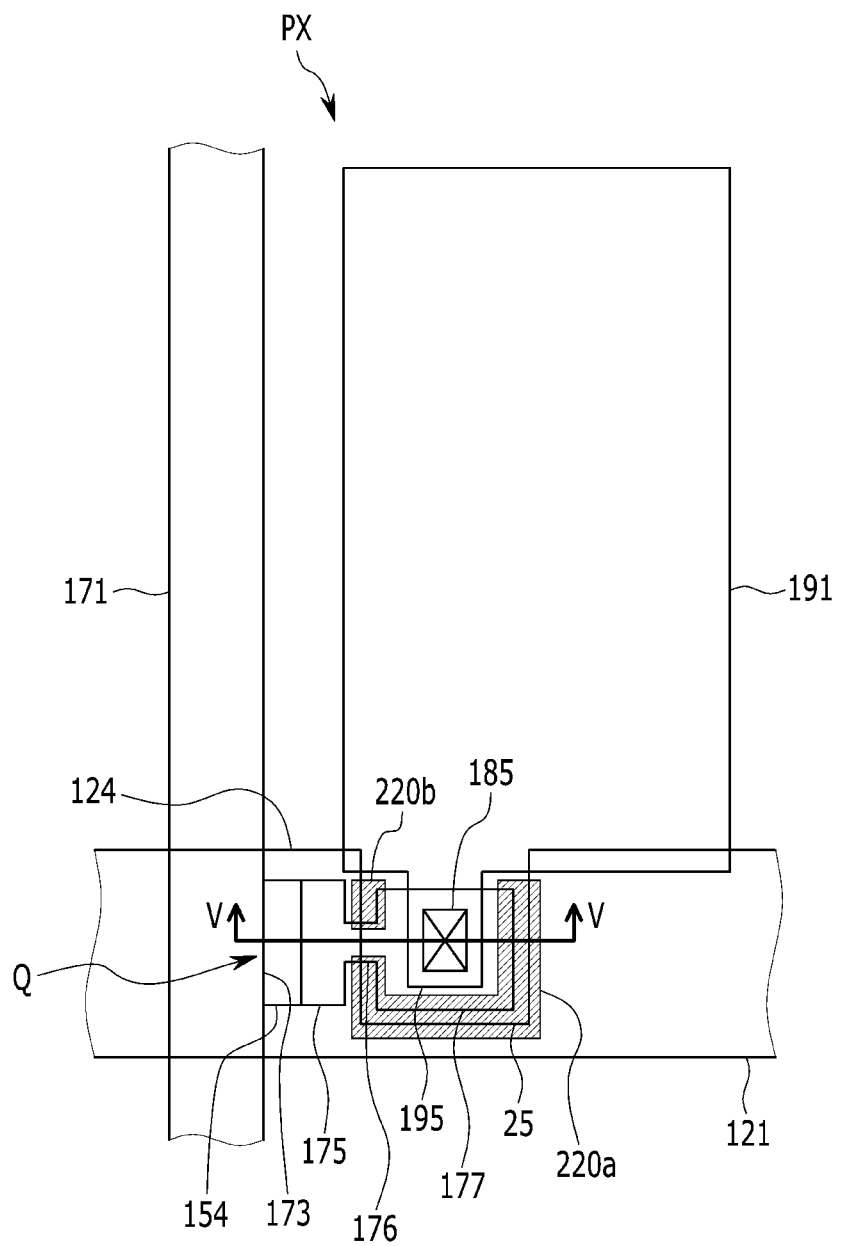
FIG. 4 is a plan view of a pixel of an exemplary embodiment of an LCD according to the invention.
Figure 5:
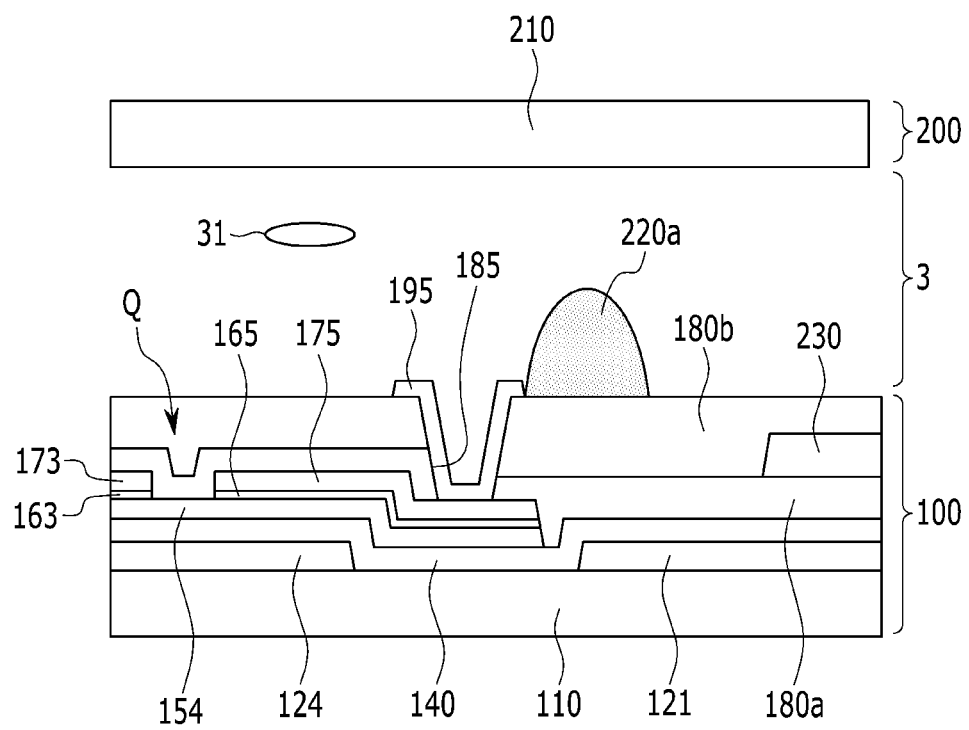
FIG. 5 is a cross-sectional view of the LCD shown in FIG. 4 taken along line V-V.
Figure 6:
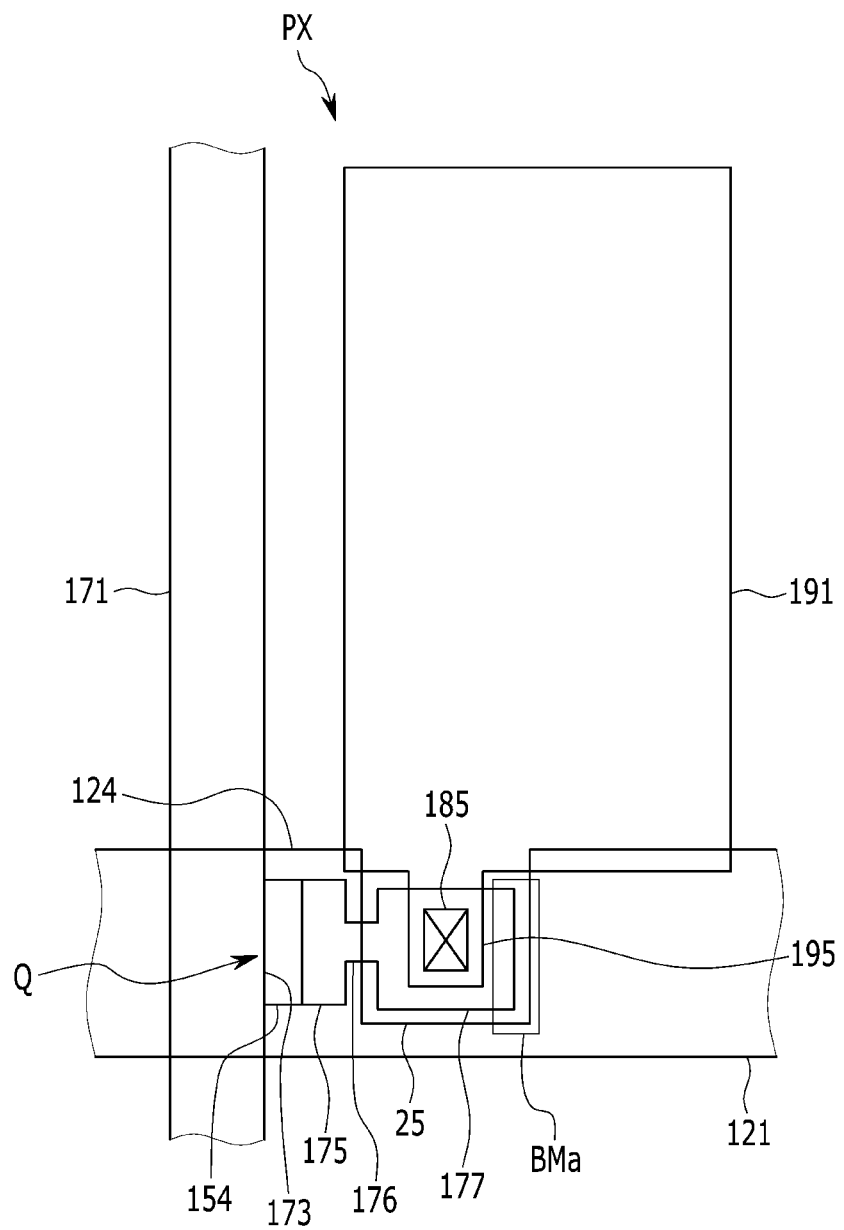
FIGS. 6 to 8 are plan views of an exemplary embodiment of a pixel of an LCD according to the invention.
Figure 7:
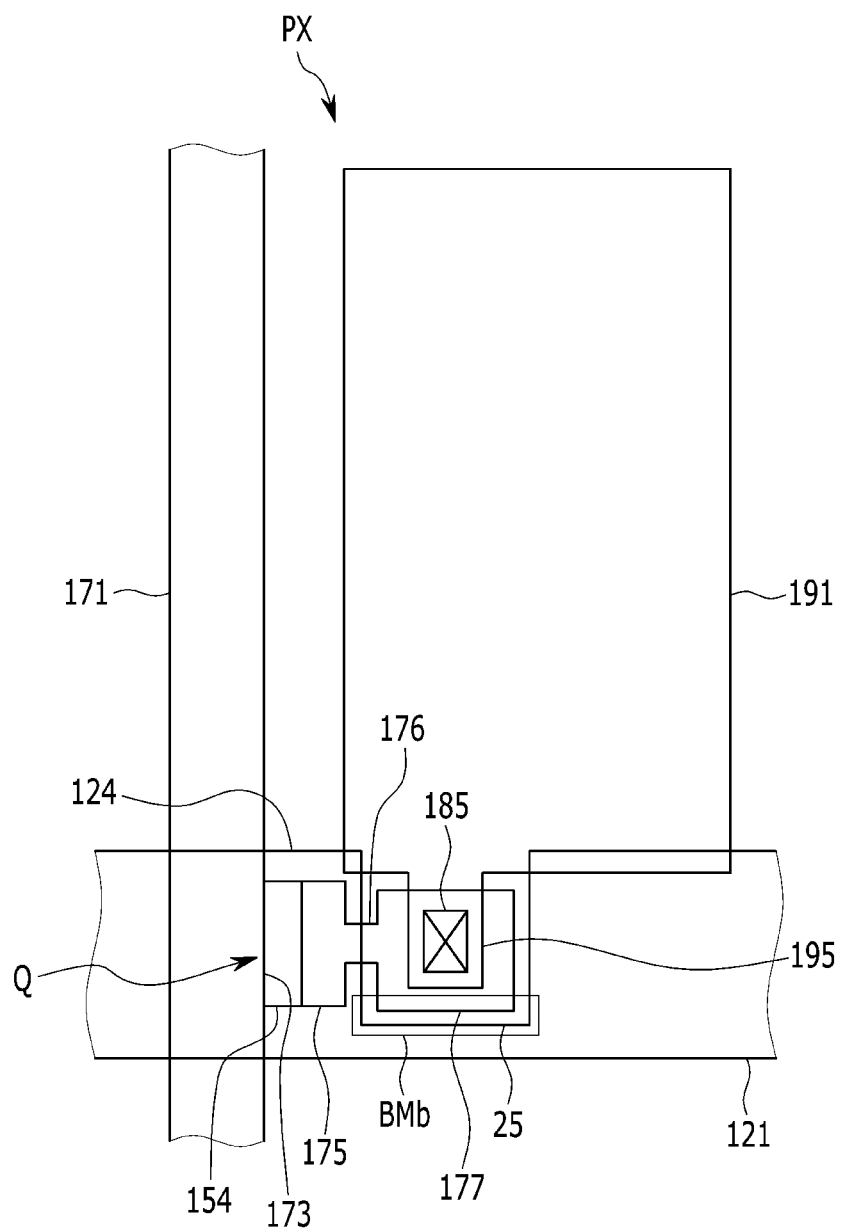
Figure 8:
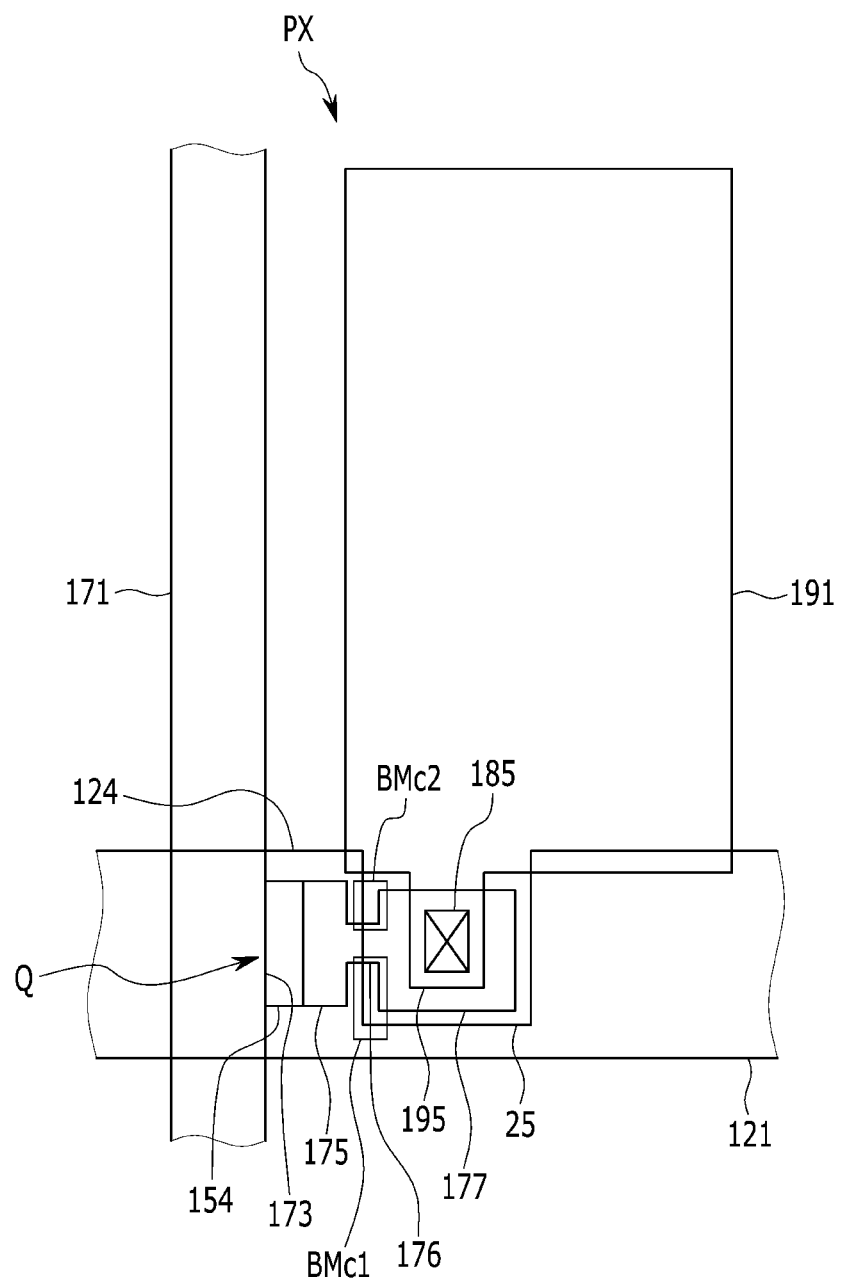

FIG. 4 is a plan view of a pixel of an LCD according to an exemplary embodiment of the invention, FIG. 5 is a cross-sectional view of the LCD shown in FIG. 4 taken along line V-V, and FIGS. 6 to 8 are plan views of a pixel of an LCD according to an exemplary embodiment of the invention.

Referring to FIGS. 4 and 5, the LCD according to an exemplary embodiment of the invention includes the lower panel 100 and the upper panel 200 facing each other, and the liquid crystal layer 3 interposed therebetween.

The upper panel 200 includes a substrate 210 including transparent glass or plastic.

Referring to the lower panel 100, a gate conductor including a plurality of gate lines 121 is disposed on a substrate 110 including transparent glass or plastic.

The gate line 121 transmits a gate signal including a gate-off voltage Voff and a gate-on voltage Von, and mainly extends in a horizontal direction. The gate line 121 includes a gate electrode 124, and a recess portion 25 may be defined in the gate electrode 124.

In an exemplary embodiment, the gate line 121 may include aluminum (Al) or an aluminum-based metal such as an aluminum alloy, silver (Ag) or silver-based metal such as a silver alloy, copper (Cu) or a copper-based metal such as a copper alloy, molybdenum (Mo) or a molybdenum-based metal such as a molybdenum alloy, chromium (Cr), tantalum (Ta), or titanium (Ti), for example. In another exemplary embodiment, the gate line 121, however, may have a multilayer structure including at least two conductive layers having different physical properties. In an exemplary embodiment, the gate line 121 may include a metal having low reflectance or a deposition structure having low reflectance such as titanium (Ti)/indium zinc oxide ("IZO")/copper (Cu), for example.

A gate insulating layer 140 is disposed on the gate conductor. In an exemplary embodiment, the gate insulating layer 140 may include a silicon nitride ($SiN_x$) or a silicon oxide ($SiO_x$), for example. In an exemplary embodiment, the gate insulating layer 140 may have a multilayer structure including at least two insulating layers having different physical properties.

A semiconductor 154 is disposed on the gate insulating layer 140. In an exemplary embodiment, the semiconductor 154 may include amorphous silicon, polysilicon, or an oxide semiconductor.

Ohmic contacts 163 and 165 may be positioned on the semiconductor 154. In an exemplary embodiment, the ohmic contacts 163 and 165 may include n+ hydrogenated amorphous silicon doped with n-type impurities such as phosphorus at a high concentration, or a silicide, for example. In an exemplary embodiment, the ohmic contacts 163 and 165 may be disposed as a pair on the semiconductor 154. In an exemplary embodiment, the semiconductor 154 may have an island shape in a plan view. In another exemplary embodiment, the ohmic contact 163 and 165 may be omitted according to a kind of the semiconductor 154.

A data conductor including a data line 171 having a source electrode 173 and a drain electrode 175 is disposed on the ohmic contacts 163 and 165 and the gate insulating layer 140.

The data line 171 transmits a data signal and mainly extends in a vertical direction thereby intersecting the gate line 121.

The data line 171 includes the source electrode 173. According to an exemplary embodiment shown in FIG. 4, the source electrode 173 may not be protruded from the data line 171 and may be positioned at the same line as the data line 171.

The drain electrode 175 faces the source electrode 173. The drain electrode 175 may include a bar-type portion extending approximately parallel to the source electrode 173, an expansion 177 opposite thereto, and a connection 176 connecting the bar-type portion and the expansion 177.

In an exemplary embodiment, the data conductor may include a refractory metal such as molybdenum, chromium, tantalum, and titanium, or alloys of them, for example, and may have a multilayer structure including a refractory metal layer (not shown) and a row-resistance conductive layer (not shown). In an exemplary embodiment, the multilayer structure, for example, may be a double layer of a chromium or molybdenum (alloy) lower layer and an aluminum (alloy) upper layer, or a triple layer of a molybdenum (alloy) lower layer, an aluminum (alloy) intermediate layer, and a molybdenum (alloy) upper layer, for example. However, the invention is not limited thereto, and the data line 171 and the drain electrode 175 may include a variety of metals and conductors other than the above.

In an exemplary embodiment, the data line 171 may include the metal having low reflectance or a deposition structure having low reflectance such as titanium (Ti)/IZO/copper (Cu), for example.

The gate electrode 124, the source electrode 173, and the drain electrode 175 constitute one thin film transistor ("TFT"), together with the semiconductor 154, and a channel of the TFT is provided at the semiconductor 154 between the source electrode 173 and the drain electrode 175.

In an exemplary embodiment of the invention, the TFT Q includes the source electrode 173 in the same line as the data line 171 and the drain electrode 175 extending in parallel with the data line 171 such that it is possible to increase the width of the TFT without increasing an area of the data conductor, such that the aperture ratio of the LCD can be increased.

A first passivation layer 180a is positioned on the data conductor, the gate insulating layer 140, and the exposed portion of the semiconductor 154. The first passivation layer 180a may include an organic insulating material or an inorganic insulating material.

A color filter 230 may be positioned on the first passivation layer 180a. The color filter 230 may uniquely display one of primary colors. In an exemplary embodiment, the primary colors may include three primary colors such as red, green, and blue and three primary colors such as yellow, cyan, and magenta, for example. In another exemplary embodiment, the primary colors may include four primary colors. In another exemplary embodiment of the invention, the color filter 230 may further include a color filter displaying a mixed color of the primary colors or white in addition to the primary colors. Each color filter 230 may be provided to be elongated along a pixel column or a pixel row.

In another exemplary embodiment, the color filter 230 may be positioned at the upper panel 200.

A second passivation layer 180b is positioned on the color filter 230. The second passivation layer 180b may include an insulating layer or an organic insulator, and may prevent the color filter 230 from being exposed as an overcoat for the color filter 230 and provide a flat surface. The second passivation layer 180b may prevent an impurity such as a pigment of the color filter 230 from flowing into the liquid crystal layer 3.

A contact hole 185 exposing the drain electrode 175 may be defined in the first passivation layer 180a and the second passivation layer 180b.

In another exemplary embodiment, the second passivation layer 180b may be omitted.

A pixel electrode 191 is positioned on the second passivation layer 180b. In another exemplary embodiment, the pixel electrode 191 may have an approximate plane shape or may include a plurality of branch electrodes. The pixel electrode 191 may include a protrusion 195. The protrusion 195 is physically and electrically connected to the drain electrode 175 through the contact hole 185 of the first passivation layer 180a and the second passivation layer 180b thereby receiving the data voltage from the drain electrode 175.

Referring to FIG. 4, the expansion 177 of the drain electrode 175, the contact hole 185, and the protrusion 195 of the pixel electrode 191 may be positioned within the recess portion 25 of the gate line 121. In this case, the side of the recess portion 25 may include a portion facing the expansion 177 of the drain electrode 175 or the protrusion 195 of the pixel electrode 191.

In the illustrated exemplary embodiment, by positioning the recess portion 25 of the gate line 121 to overlap a region where the expansion 177 of the drain electrode 175 and the protrusion 195 of the pixel electrode 191 are contacted in a plan view, a parasitic capacitance between the gate line 121 and the drain electrode 175 or the pixel electrode 191 may be reduced. Accordingly, a kickback voltage caused by the parasitic capacitance between the gate line 121 and the drain electrode 175 or the pixel electrode 191 may be reduced and a delay of the gate signal may be reduced.

In an exemplary embodiment, the pixel electrode 191 may include the transparent conductive material such as indium tin oxide ("ITO") or IZO.

In an exemplary embodiment of the invention, the lower panel 100 may further include an opposing electrode (not shown) generating the electric field to the liquid crystal layer 3 along with the pixel electrode 191. In this case, the opposing electrode may be positioned on or under the pixel electrode 191, and may or may not overlap the pixel electrode 191.

According to another exemplary embodiment of the invention, the opposing electrode may be positioned at the upper panel 200.

In an exemplary embodiment, the opposing electrode may also include the transparent conductive material such as ITO or IZO.

The LCD according to an exemplary embodiment of the invention includes at least one of light blocking members 220a and 220b. The light blocking members 220a and 220b may include a first light blocking member 220a and a second light blocking member 220b separated from each other. In an exemplary embodiment, the first light blocking member 220a and the second light blocking member 220b may be provided as island types in a plan view, and may be positioned in one pixel PX.

The first light blocking member 220a and the second light blocking member 220b prevent light leakage, and may include a pigment such as carbon black or a photosensitive organic material, for example.

Referring to FIG. 6, among sides of the recess portion 25 of the gate line 121, a right side may include a portion facing the expansion 177 of the drain electrode 175 or the protrusion 195 of the pixel electrode 191, and two facing portions and a region therebetween are referred to as a first light leakage portion BMa.

Referring to FIG. 7, among the sides of the recess portion 25 of the gate line 121, a lower side may include a portion facing the expansion 177 of the drain electrode 175 or the protrusion 195 of the pixel electrode 191, and two facing portions and the region therebetween are referred to as a second light leakage portion BMb.

Referring to FIG. 8, among the sides of the recess portion 25 of the gate line 121, a left side may include portions facing the expansion 177 of the drain electrode 175 or the protrusion 195 of the pixel electrode 191, and two facing portions and the regions therebetween are referred to as third light leakage portions BMc1 and BMc2.

Particularly, the connection 176 of the drain electrode 175 may be bypassed near the left side of the recess portion 25 of the gate line 121. When the data conductor includes the non-transparent conductive material such as the metal, the connection 176 of the drain electrode 175 may prevent the light leakage such that the third light leakage portions BMc1 and BMc2 may be divided into a lower third light leakage portion BMc1 and an upper third light leakage portion BMc2 that are respectively positioned upwardly and downwardly with respect to the connection 176 in a plan view.

Referring back to FIG. 4, the first light blocking member 220a may overlap and cover the first light leakage portion BMa, the second light leakage portion BMb, and the lower third light leakage portion BMc1 at one time, and the second light blocking member 220b is separated from the first light blocking member 220a and may only overlay and cover the upper third light leakage portion BMc2.

A fringe field including a horizontal component caused by the voltage difference between the gate signal and the data voltage transmitted by the drain electrode 175 or the pixel electrode 191 may be generated between the gate line 121 and the drain electrode 175 or the pixel electrode 191. This electric field affects the arrangement of the liquid crystal molecules 31 such that the light leakage may be undesirably generated. Particularly, the gate line 121 transmits the gate-off voltage Voff for most time of one frame, and at this time, the gate-off voltage Voff is considerably smaller than the data voltage such that the intensity of the electric field generated between the gate line 121 and the drain electrode 175 or the pixel electrode 191 is further increased, and as a result, the intensity of the leakage light may be stronger. This is further exacerbated in an image displaying a black gray such that the contrast ratio of the LCD may be deteriorated and the display quality may be decreased. This light leakage, as described above, may be mainly generated at the light leakage portions BMa, BMb, BMc1, and BMc2 near the recess portion 25 of the gate line 121.

As shown in FIG. 4, in an exemplary embodiment of the invention, all light leakage portions BMa, BMb, BMc1, and BMc2 are overlapped with the first light blocking member 220a and the second light blocking member 220b such that the light leakage due to the fringe field between the gate line 121 and the drain electrode 175 or pixel electrode 191 may be blocked.

The first light blocking member 220a and the second light blocking member 220b are selectively and minimally provided only at the region of the light leakage portions BMa, BMb, BMc1, and BMc2 where the light leakage may be easily generated, thereby effectively limiting the amount of the light blocking material.

Also, the light leakage between the adjacent pixels PX may be prevented by the non-transparent conductive material of the gate line 121 and the data line 171. When blocking the light leakage by using the non-transparent conductive material, to prevent the quality deterioration caused by the reflection of the external light, the gate line 121 and the data line 171 may include the metal having the low reflectance or the deposition structure having the low reflectance such as titanium (Ti)/IZO/copper (Cu), for example.

Referring to FIGS. 4 and 5, the first light blocking member 220a and the second light blocking member 220b may be positioned at the lower panel 100, and in detail, a height of the first light blocking member 220a or the second light blocking member 220b may be higher than that of the pixel electrode 191 in a cross section.

Like an exemplary embodiment of the invention, by positioning the color filter 230 and the light blocking members 220a and 220b at the lower panel 100 along with the TFT Q, alignment between the light blocking members 220a and 220b and the color filter 230, and the pixel electrode 191 and the TFT Q, is easy such that an alignment error may be reduced. Accordingly, the light leakage of the LCD due to the misalignment between these constituent elements or an aperture ratio deterioration may be prevented, and the transmittance may be increased.

As described above, since only the first light blocking member 220a and the second light blocking member 220b are selectively provided at the region of the light leakage portions BMa, BMb, BMc1, and BMc2 where the light leakage may be easily generated as the minimum region, as shown in FIGS. 4 and 5, although the light blocking members 220a and 220b are adjacent to the liquid crystal layer 3, the amount of the pigment component such as a halogen element of the light blocking members 220a and 220b that flows or diffuses into the liquid crystal layer 3 as the impurity may be minimized. Accordingly, afterimages due to the impurity flowed into the liquid crystal layer 3 may be prevented and reliability of the LCD may be increased.

Next, an LCD according to an exemplary embodiment of the invention will be described with reference to FIGS. 9 and 10 as well as the described drawings.

Figure 9:
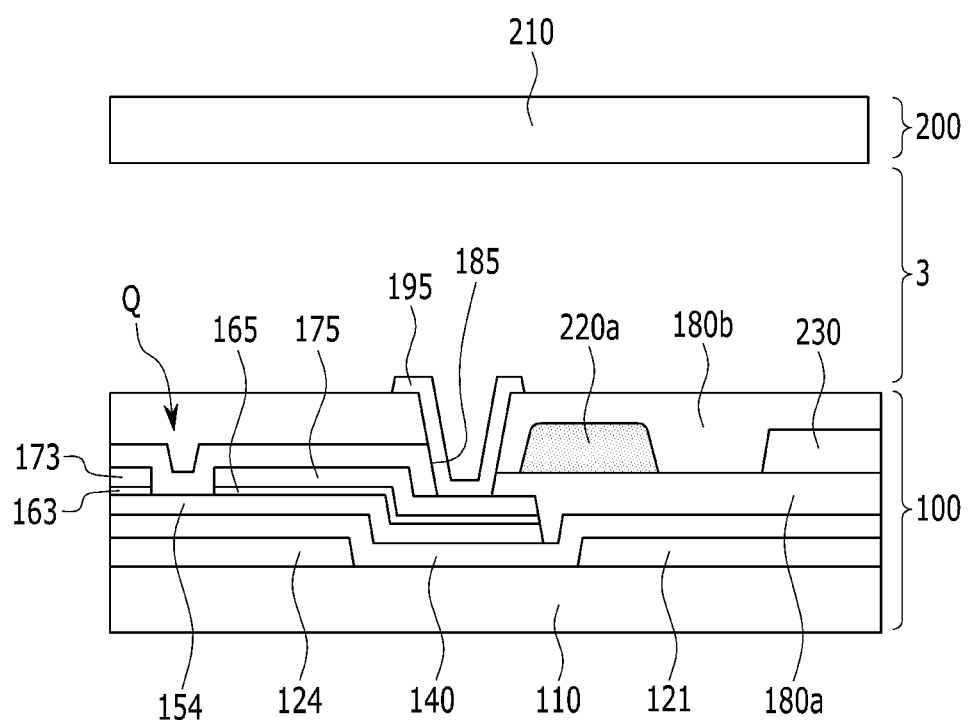
FIGS. 9 and 10 are cross-sectional views of the LCD shown in FIG. 4 taken along line V-V.
Figure 10:
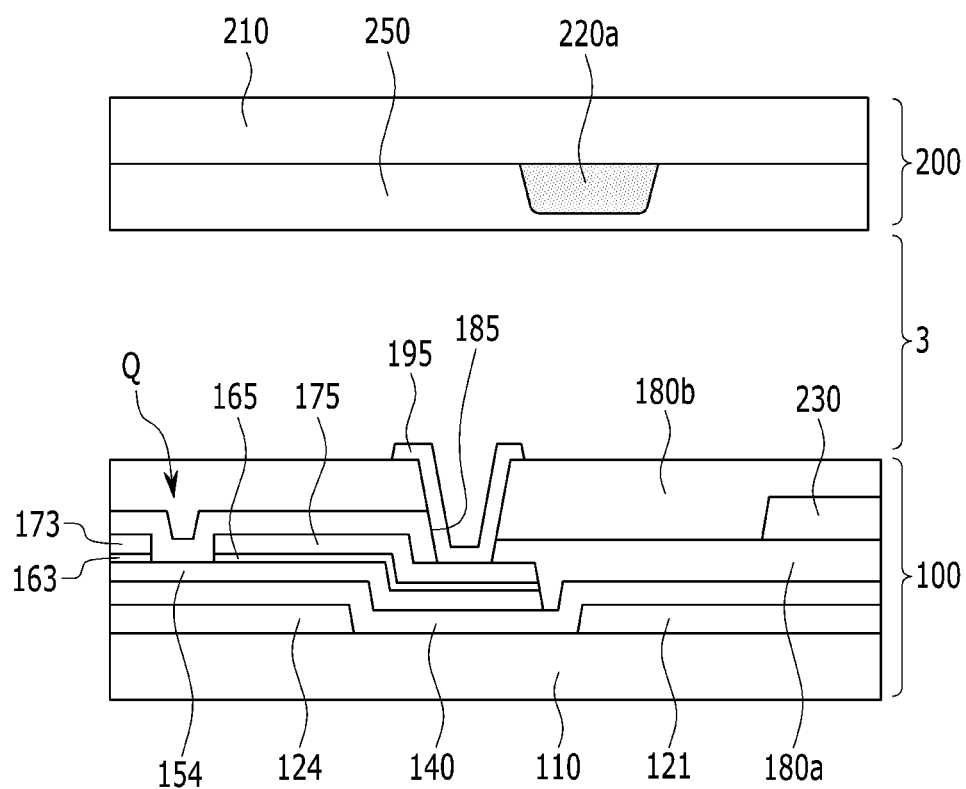

FIGS. 9 and 10 are a cross-sectional view of the LCD shown in FIG. 4 taken along line V-V.

The LCD according to the illustrated exemplary embodiment is substantially the same as the exemplary embodiment shown in FIGS. 4 to 8, but the position of the light blocking members 220a and 220b may be different.

Referring to FIG. 9, the light blocking members 220a and 220b may be positioned under the pixel electrode 191. In detail, the light blocking members 220a and 220b may be positioned between the first passivation layer 180a and the second passivation layer 180b like the color filter 230. In this case, a possibility of the impurity of the light blocking members 220a and 220b flowing into the liquid crystal layer 3 is further decreased such that the reliability of the LCD may be further increased.

Referring to FIG. 10, the light blocking members 220a and 220b may be positioned at the upper panel 200. That is, the light blocking members 220a and 220b may be positioned on the substrate 210. An overcoat 250 may be further positioned on the light blocking member 220a and 220b. The overcoat 250 may prevent the light blocking member 220a and 220b from being exposed.

Next, an LCD according to an exemplary embodiment of the invention will be described with reference to FIGS. 11 to 13 as well as the described drawings.

Figure 11:
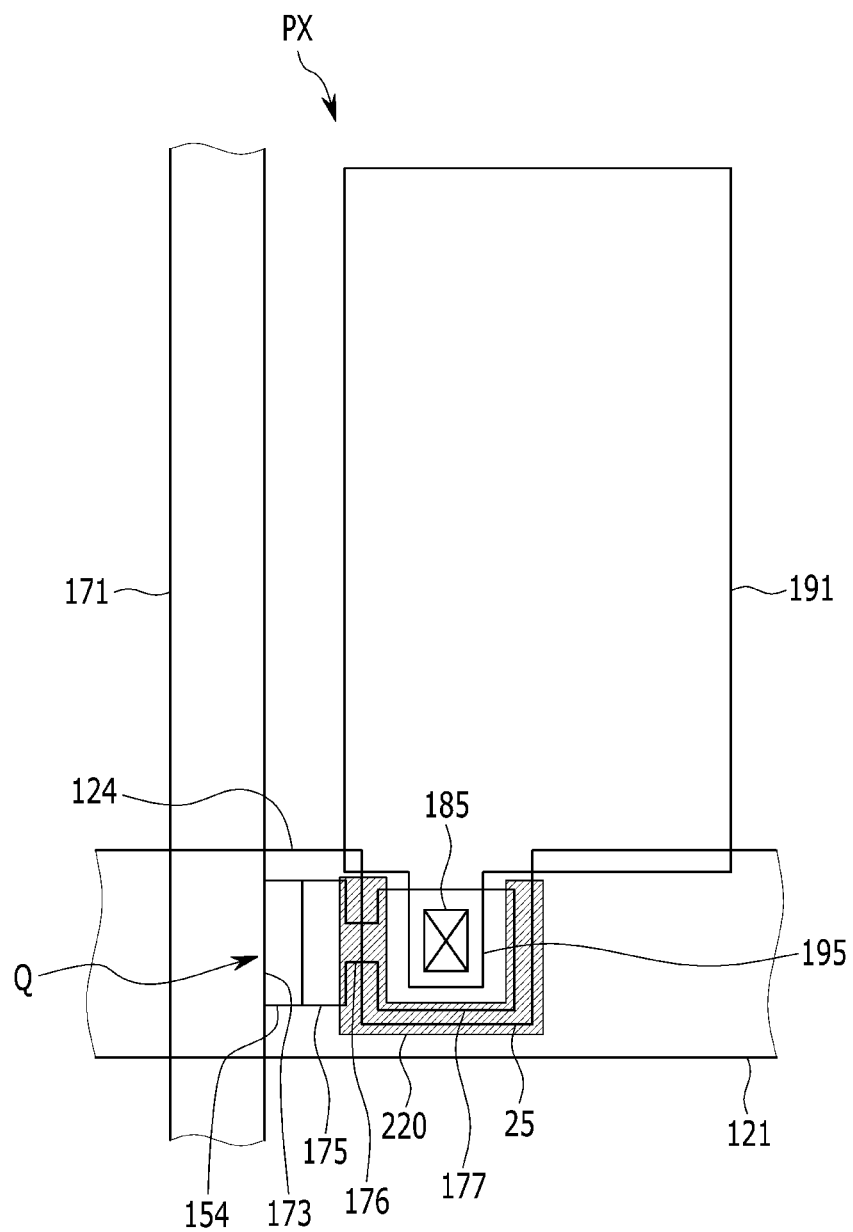
FIGS. 11 to 13 are plan views of an exemplary embodiment of a pixel of an LCD according to the invention.
Figure 12:
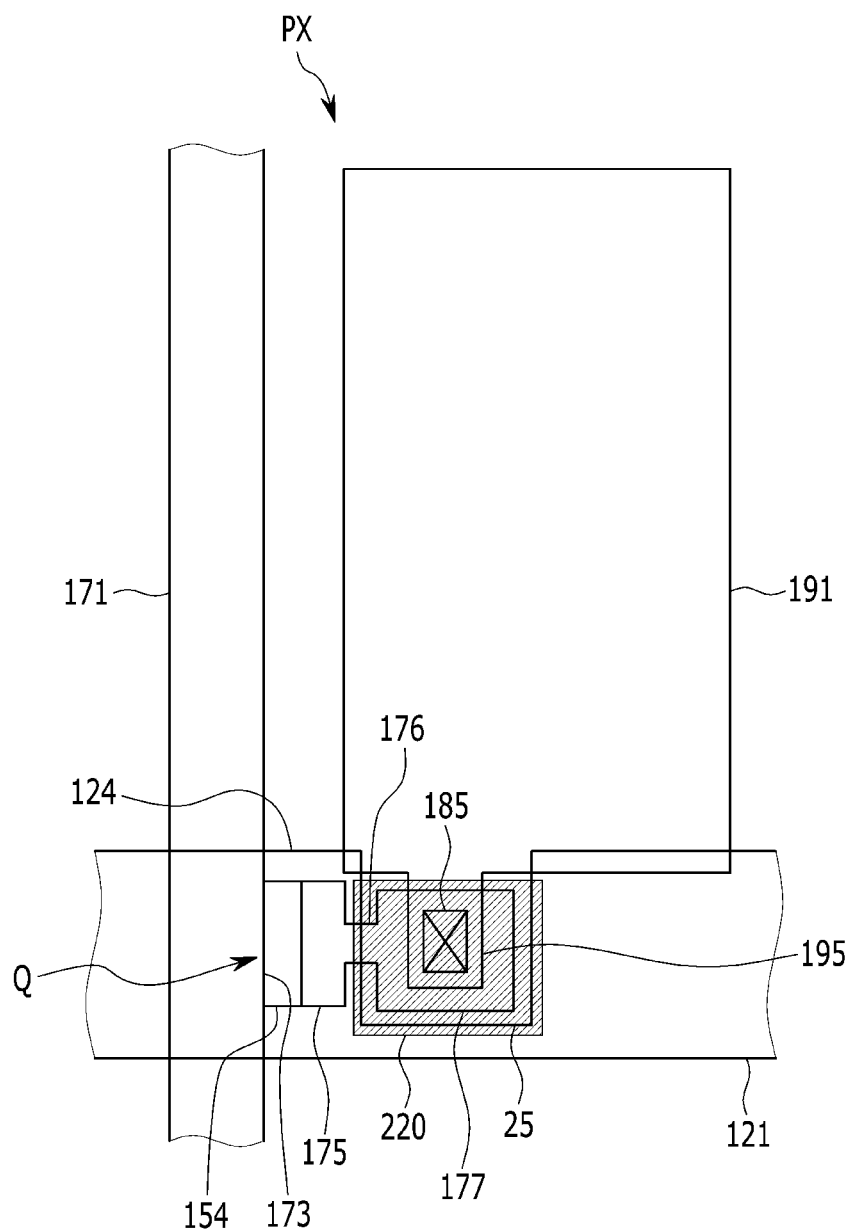
Figure 13:
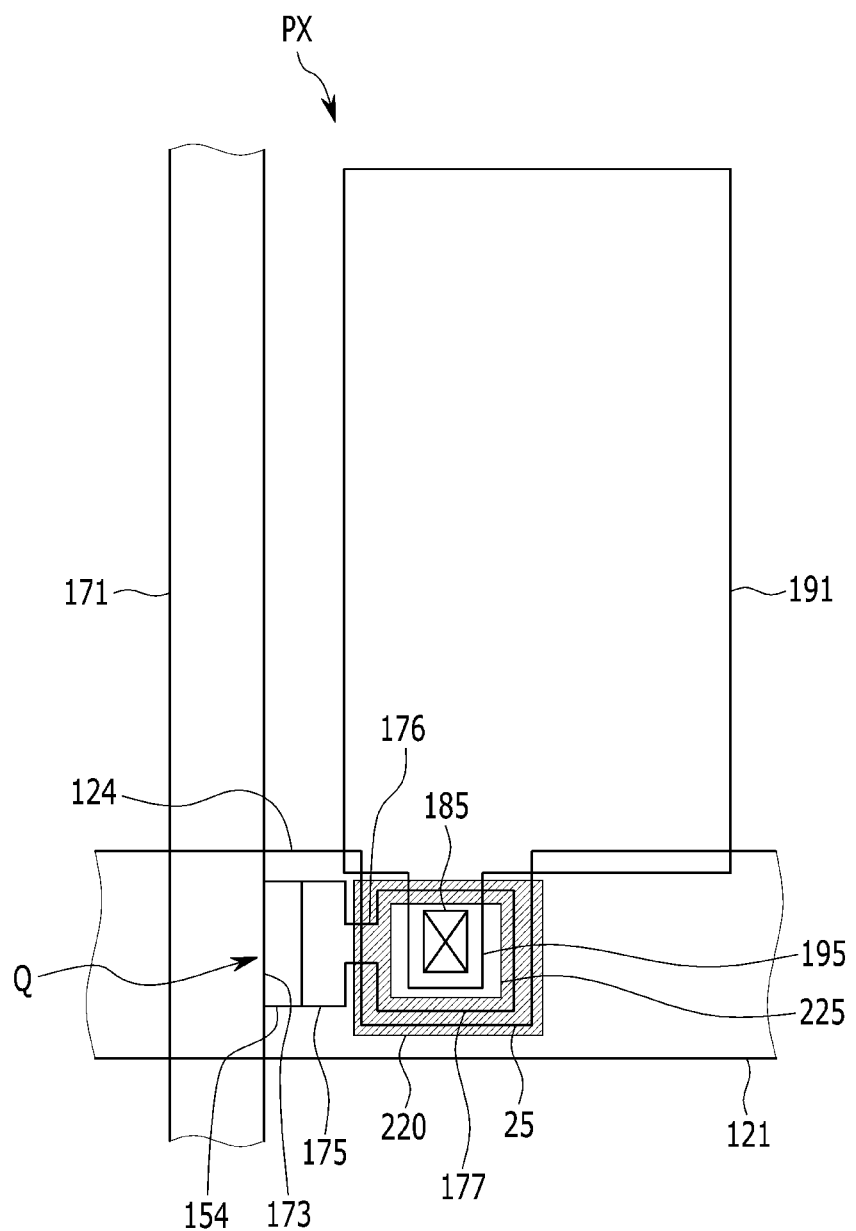

FIGS. 11 to 13 are plan views of a pixel of an LCD according to an exemplary embodiment of the invention.

The LCD according to the illustrated exemplary embodiment is substantially the same as the exemplary embodiment shown in FIGS. 4 to 10, but a shape of the light blocking member may be different.

Referring to FIG. 11, the LCD according to an exemplary embodiment of the invention includes an island light blocking member 220 positioned corresponding to one pixel PX. The light blocking member 220 may overlap and cover all of the first light leakage portion BMa, the second light leakage portion BMb, the lower third light leakage portion BMc1, and the upper third light leakage portion BMc2 near the recess portion 25 of the gate line 121, as described above. Accordingly, the light blocking member 220 includes three bar portions connected to each other. The light blocking member 220 may block all the light leakage caused by the fringe field between the gate line 121 and the drain electrode 175 or the pixel electrode 191.

Referring to FIG. 12, the LCD according to an exemplary embodiment of the invention includes the island light blocking member 220 positioned corresponding to one pixel PX. The light blocking member 220 according to the illustrated exemplary embodiment may also overlap and cover the recess portion 25 of the gate line 121 enclosed by the first light leakage portion BMa, the second light leakage portion BMb, the lower third light leakage portion BMc1, and the upper third light leakage portion BMc2 as well as the first light leakage portion BMa, the second light leakage portion BMb, the lower third light leakage portion BMc1, and the upper third light leakage portion BMc2. Accordingly, the light blocking member 220 may be an approximate convex polygon, for example, a convex quadrangle in a plan view. However, the shape of the light blocking member 220 is not limited thereto, and any shape covering the recess portion 25 of the gate line 121 is possible.

Referring to FIG. 13, the LCD according to an exemplary embodiment of the invention includes the island light blocking member 220 positioned corresponding to one pixel PX. The light blocking member 220 according to the illustrated exemplary embodiment is substantially the same as the exemplary embodiment shown in FIG. 12, but an opening 225 at the center of the light blocking member 220 may be further defined. The opening 225 may overlap the expansion 177. Accordingly, the light blocking member 220 may have a donut shape of the approximate convex polygon in a plan view, for example, the donut shape of the convex quadrangle. The light blocking member 220 according to the illustrated exemplary embodiment may overlap an upper edge portion of the recess portion 25. However, the shape of the light blocking member 220 is not limited thereto, and any shape covering the edge portion of the recess portion 25 of the gate line 121 such as a looped curved line is possible.

In the exemplary embodiments shown in FIGS. 11 to 13, the position of the light blocking member 220 may also be variously changed like the exemplary embodiments shown in FIGS. 9 and 10. A detailed structure of the LCD according to an exemplary embodiment of the invention will be described with reference to FIGS. 14 and 15 as well as the described drawings.

Figure 14:
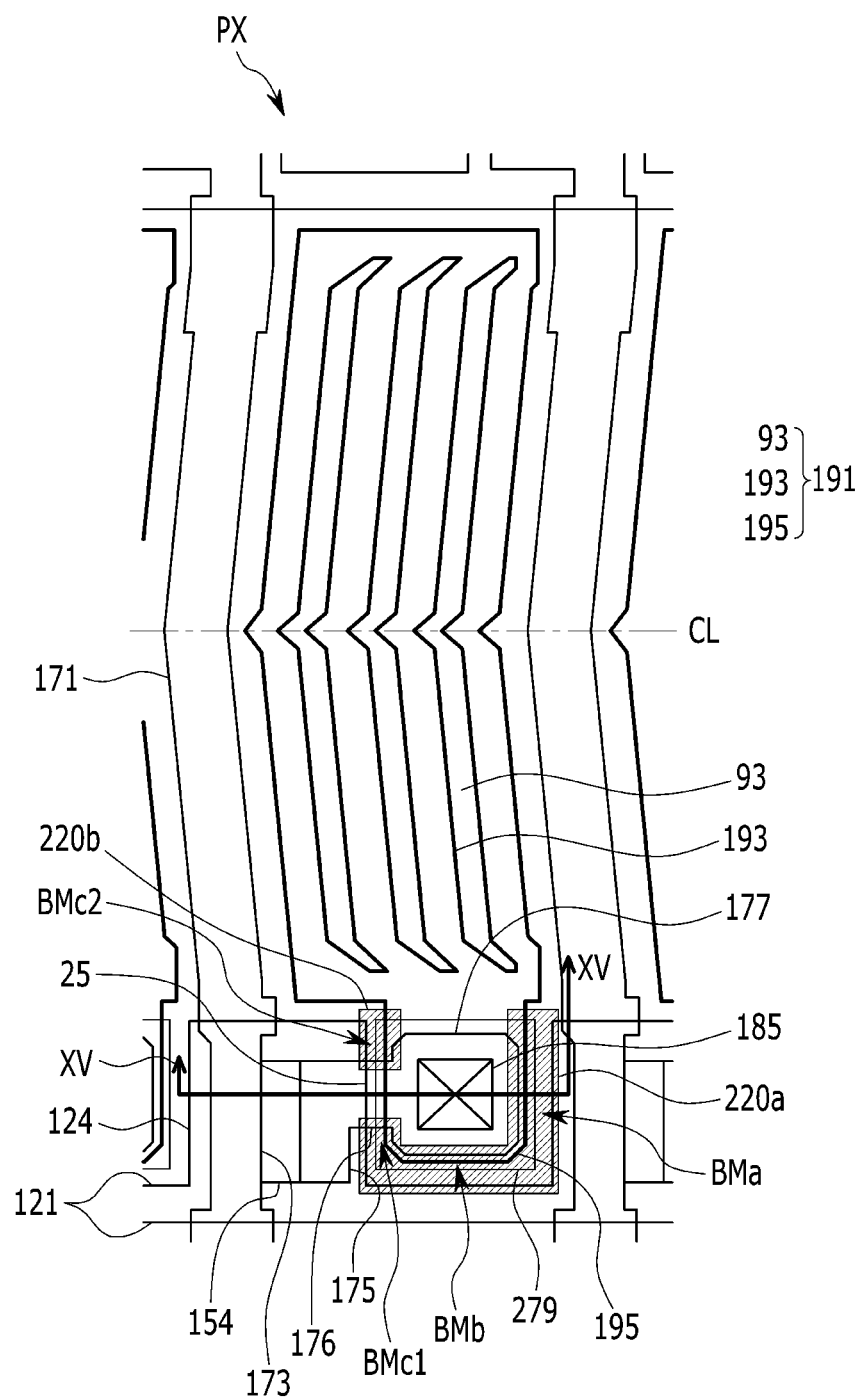
FIG. 14 is a plan view of an exemplary embodiment of a pixel of an LCD according to the invention.
Figure 15:
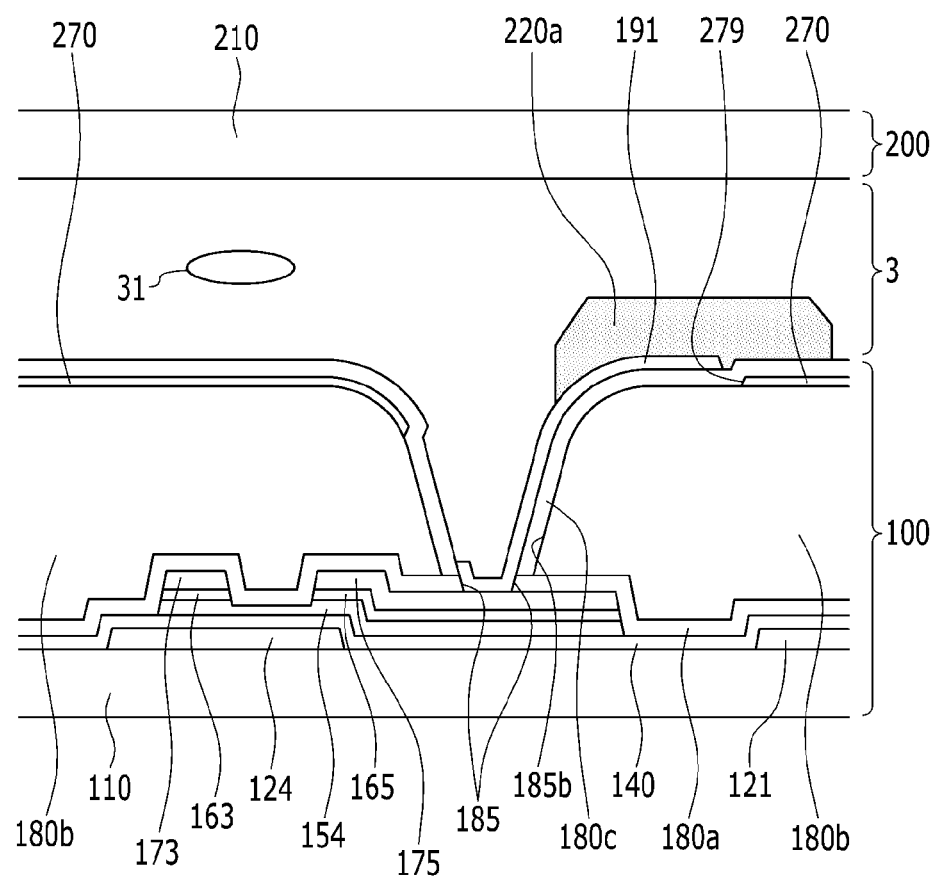
FIG. 15 is a cross-sectional view of the LCD shown in FIG. 14 taken along line XV-XV.

FIG. 14 is a plan view of a pixel of an LCD according to an exemplary embodiment of the invention, and FIG. 15 is a cross-sectional view of the LCD shown in FIG. 14 taken along line XV-XV.

The LCD according to the illustrated exemplary embodiment is the same as most of the exemplary embodiments shown in FIGS. 4 to 13 such that differences will be described.

Referring to FIGS. 14 and 15, the LCD according to an exemplary embodiment of the invention includes the lower panel 100 and the upper panel 200 facing each other, and the liquid crystal layer 3 interposed therebetween.

The upper panel 200 includes the substrate 210.

Referring to the lower panel 100, the gate conductor including a plurality of gate lines 121 is disposed on the substrate 110.

The gate lines 121 mainly extend in the horizontal direction, and include the gate electrode 124. The recess portion 25 may be defined in the gate electrode 124.

The gate insulating layer 140 is disposed on the gate conductor, and the semiconductor 154 is disposed on the gate insulating layer 140. The ohmic contacts 163 and 165 may be positioned on the semiconductor 154.

The data conductor including the data line 171 including the source electrode 173 and the drain electrode 175 is disposed on the ohmic contacts 163 and 165 and the gate insulating layer 140.

The data line 171 may be curved at predetermined intervals in order to improve transmittance. In an exemplary embodiment, as illustrated in FIG. 14, each data line 171 may be curved at least one time at a portion corresponding to a horizontal center line CL of one pixel PX, for example.

The drain electrode 175 may include the bar type portion extending approximately parallel to the source electrode 173, the expansion 177 opposite thereto, and the connection 176 connecting the bar type portion and the expansion 177.

The first passivation layer 180a is positioned on the data conductor, the gate insulating layer 140, and the exposed portion of the semiconductor 154.

In an exemplary embodiment, a color filter (not shown) may be positioned on the first passivation layer 180a. In another exemplary embodiment, the color filter 230 may be positioned in the upper panel 200.

In an exemplary embodiment, the second passivation layer 180b is positioned on the first passivation layer 180a and the color filter. An opening 185b corresponding to a portion of the drain electrode 175 may be defined in the second passivation layer 180b.

An opposing electrode 270 may be positioned on the second passivation layer 180b. In an exemplary embodiment, the opposing electrode 270 may be disposed on an entire surface of the substrate 110 with a plane shape. The opposing electrode 270 positioned at neighboring pixels PX is connected, thereby receiving a common voltage of a predetermined magnitude.

An opening 279 corresponding to the expansion 177 of the drain electrode 175 may be defined in the opposing electrode 270.

A third passivation layer 180c may be positioned on the opposing electrode 270. The third passivation layer 180c may include the organic insulating material or the inorganic insulating material. In an exemplary embodiment, the third passivation layer 180c may have a flat surface.

The contact hole 185 exposing the drain electrode 175 may be defined in the first passivation layer 180a and the third passivation layer 180c. The contact hole 185 may be defined within the opening 185b of the second passivation layer 180b in an exemplary embodiment, and an outer boundary of the contact hole 185 and an outer boundary of the opening 185b may substantially accord in another exemplary embodiment.

The contact hole 185 is defined in the opening 279 of the opposing electrode 270. That is, the opening 279 of the opposing electrode 270 may surround the contact hole 185.

The pixel electrode 191 is positioned on the third passivation layer 180c. The pixel electrode 191 includes a plurality of branch electrodes 193 overlapping the opposing electrode 270, and a slit 93 is defined between the adjacent branch electrodes 193. The branch electrode 193 of the pixel electrode 191 may extend approximately parallel to the data line 171. The plurality of branch electrodes 193 of the pixel electrode 191 may be tilted with an oblique angle with reference to a vertical direction, and may be curved at a horizontal center line CL of the pixel electrode 191. Accordingly, the pixel electrode 191 may be divided into a plurality of domains having different tilt directions of the branch electrodes 193 based on the horizontal center line CL of each pixel PX. In an exemplary embodiment, upper branch electrodes 193 above the horizontal center line CL may extend in an upper right direction based on the horizontal center line, and lower branch electrodes 193 below the horizontal center line CL may extend in a lower right direction, for example.

The pixel electrode 191 may also include the protrusion 195. The protrusion 195 is physically and electrically connected to the drain electrode 175 through the contact hole 185, thereby receiving the data voltage from the drain electrode 175.

According to another exemplary embodiment of the invention, positions of the pixel electrode 191 and the opposing electrode 270 may be exchanged. That is, the pixel electrode 191 may be positioned on the second passivation layer 180b, the third passivation layer 180c may be positioned thereon, and the opposing electrode 270 may be positioned thereon. In this case, the contact hole 185 may not be defined in the third passivation layer 180c and the opposing electrode 270. Further, the pixel electrode 191 may have a planer shape which fills most of the pixel PX area, and the opposing electrode 270 may include a plurality of branch electrodes (not illustrated) overlapped with the pixel electrode 191.

According to another exemplary embodiment of the invention, the pixel electrode 191 may be positioned at the lower panel 100, and the opposing electrode 270 may be positioned at the upper panel 200. However, the invention is not limited thereto, and the structure and the arrangement of the pixel electrode 191 and the opposing electrode 270 may be various.

Although not illustrated, an alignment layer is coated on the pixel electrode 191 and the third passivation layer 180c, and the alignment layer may be a horizontal alignment layer. In an exemplary embodiment, the alignment layer may be rubbed in a predetermined direction. However, according to another exemplary embodiment of the invention, the alignment layer includes a photo-reactive material to be photo-aligned.

Liquid crystal molecules 31 may be aligned so that long axes thereof are parallel to the display panels 100 and 200 in a state where an electric field is not applied to the liquid crystal layer 3, and in this case, the liquid crystal molecules may have positive dielectric anisotropy. In an exemplary embodiment, the liquid crystal molecule 31 may be a nematic liquid crystal molecule of which a long-axial direction is spirally twisted up to the upper panel 200 from the lower panel 100.

According to another exemplary embodiment of the invention, the liquid crystal molecules may be aligned so that long axes thereof are perpendicular to the panels 100 and 200 in a state where the electric field is not applied to the liquid crystal layer 3, and the liquid crystal molecules may have negative dielectric anisotropy. In this case, the structure and the like of the pixel electrode 191 and the opposing electrode 270 may be modified.

Referring to FIG. 14, the expansion 177 of the drain electrode 175, the contact hole 185, and the protrusion 195 of the pixel electrode 191 may be positioned within the recess portion 25 of the gate line 121. In this case, a side of the recess portion 25 may include a portion facing the expansion 177 of the drain electrode 175 or the protrusion 195 of the pixel electrode 191.

Among sides of the recess portion 25 of the gate line 121, a right side may include a portion facing the expansion 177 of the drain electrode 175 or the protrusion 195 of the pixel electrode 191, and two facing portions and a region therebetween are referred to as a first light leakage portion BMa. Among the sides of the recess portion 25 of the gate line 121, the lower side may include a portion facing the expansion 177 of the drain electrode 175 or the protrusion 195 of the pixel electrode 191, and two facing portions and the region therebetween are referred to as a second light leakage portion BMb. Among the sides of the recess portion 25 of the gate line 121, the left side may include a portion facing the expansion 177 of the drain electrode 175 or the protrusion 195 of the pixel electrode 191, and two facing portions and the region therebetween are referred to as third light leakage portions BMc1 and BMc2. Particularly, the connection 176 of the drain electrode 175 may be bypassed near the left side of the recess portion 25 of the gate line 121. When the data conductor includes the non-transparent conductive material such as the metal, the connection 176 of the drain electrode 175 may prevent the light leakage such that the third light leakage portions BMc1 and BMc2 may be divided into the lower third light leakage portion BMc1 and the upper third light leakage portion BMc2 that are positioned upwardly and downwardly with respect to the connection 176 in a plan view.

Particularly, in the case of the illustrated exemplary embodiment, the light leakage may be generated between a side of the opening 279 of the opposing electrode 270 and the side of the drain electrode 175 or the pixel electrode 191, and a portion between the side of the opening 279 of the opposing electrode 270 and the side of the drain electrode 175 or the pixel electrode 191 may be included in the light leakage portions BMa, BMb, BMc1, and BMc2.

In the illustrated exemplary embodiment, the first light blocking member 220a overlaps at one time and covers the first light leakage portion BMa, the second light leakage portion BMb, and the lower third light leakage portion BMc1, and the second light blocking member 220b divided from the first light blocking member 220a may overlap the upper third light leakage portion BMc2. Accordingly, since all light leakage portions BMa, BMb, BMc1, and BMc2 overlap the first light blocking member 220a and the second light blocking member 220b, the light leakage caused by the fringe field between the gate line 121 and the drain electrode 175 or the pixel electrode 191 may be blocked.

Also, according to the illustrated exemplary embodiment, the light blocking members 220a and 220b also cover the portion between the opening 279 of the opposing electrode 270 and the drain electrode 175 or the pixel electrode 191 facing each other and/or the sides thereof, such that the light leakage by the fringe field between the edge side of the opening 279 of the opposing electrode 270 and the edge side of the drain electrode 175 or the pixel electrode 191 may also be blocked.

The rest of the descriptions are the same as those of the described exemplary embodiments such that the detailed description is omitted.

Referring to FIGS. 14 and 15, like the described exemplary embodiment, the light blocking members 220a and 220b may be positioned at the lower panel 100, and in detail, may be positioned on the pixel electrode 191. However, the position of the light blocking members 220a and 220b is not limited thereto, and like the exemplary embodiment shown in FIGS. 9 and 10, the position thereof may be various.

Next, the LCD according to the exemplary embodiment of the invention will be described with reference to FIGS. 16 to 20 together with the aforementioned drawings.

Figure 16:
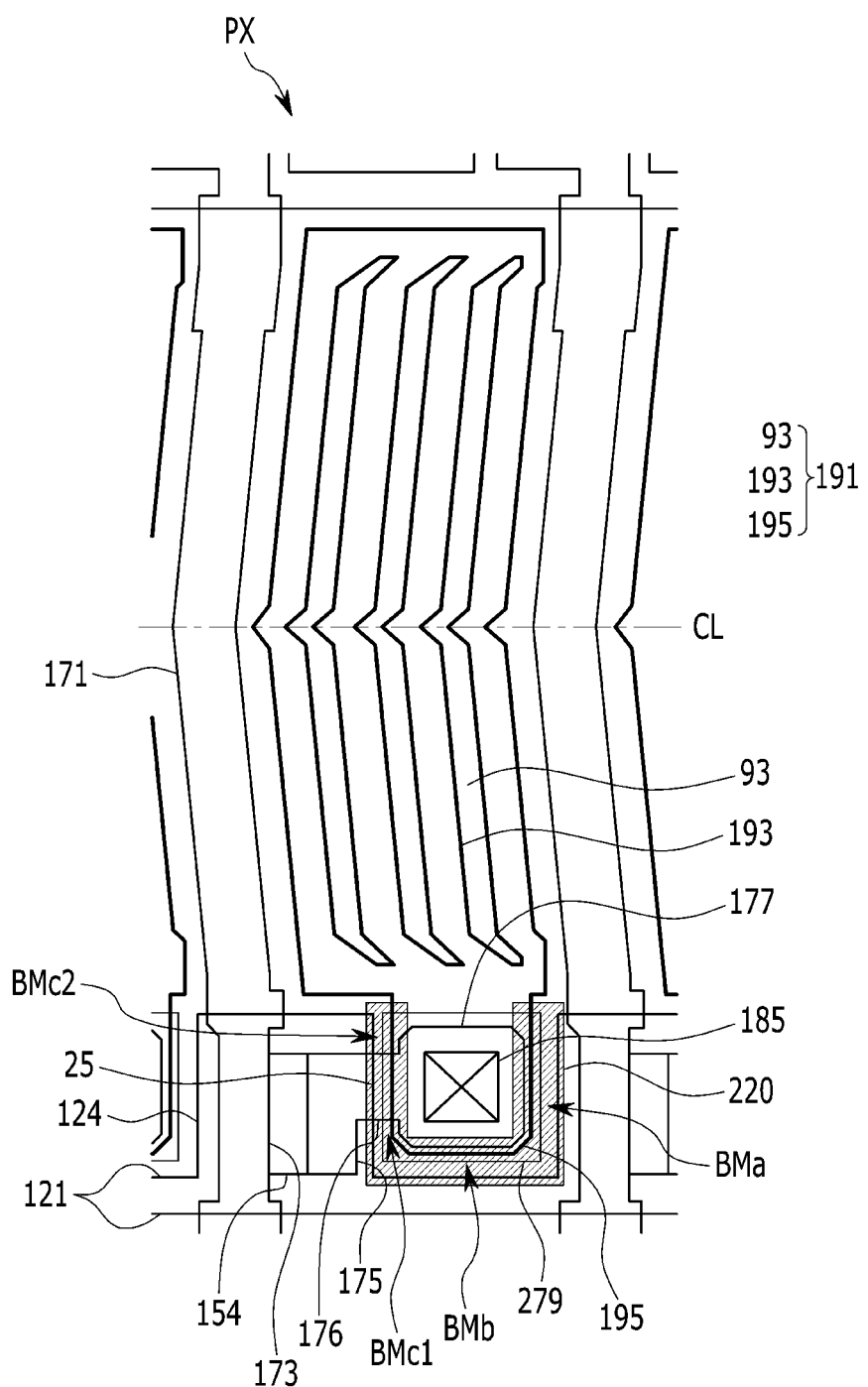
FIGS. 16 to 18 are plan views of an exemplary embodiment of a pixel of an LCD according to the invention.
Figure 17:
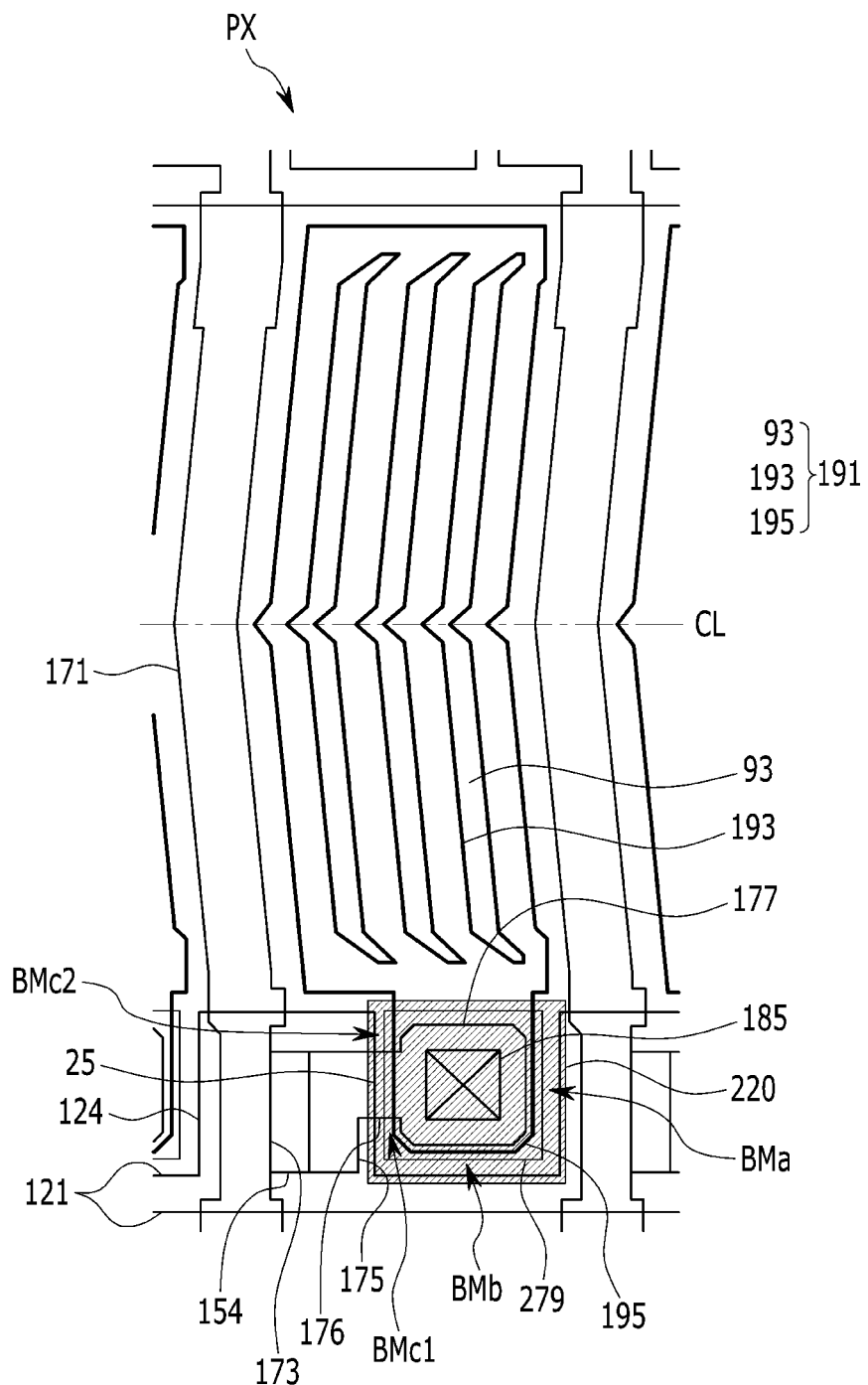
Figure 18:
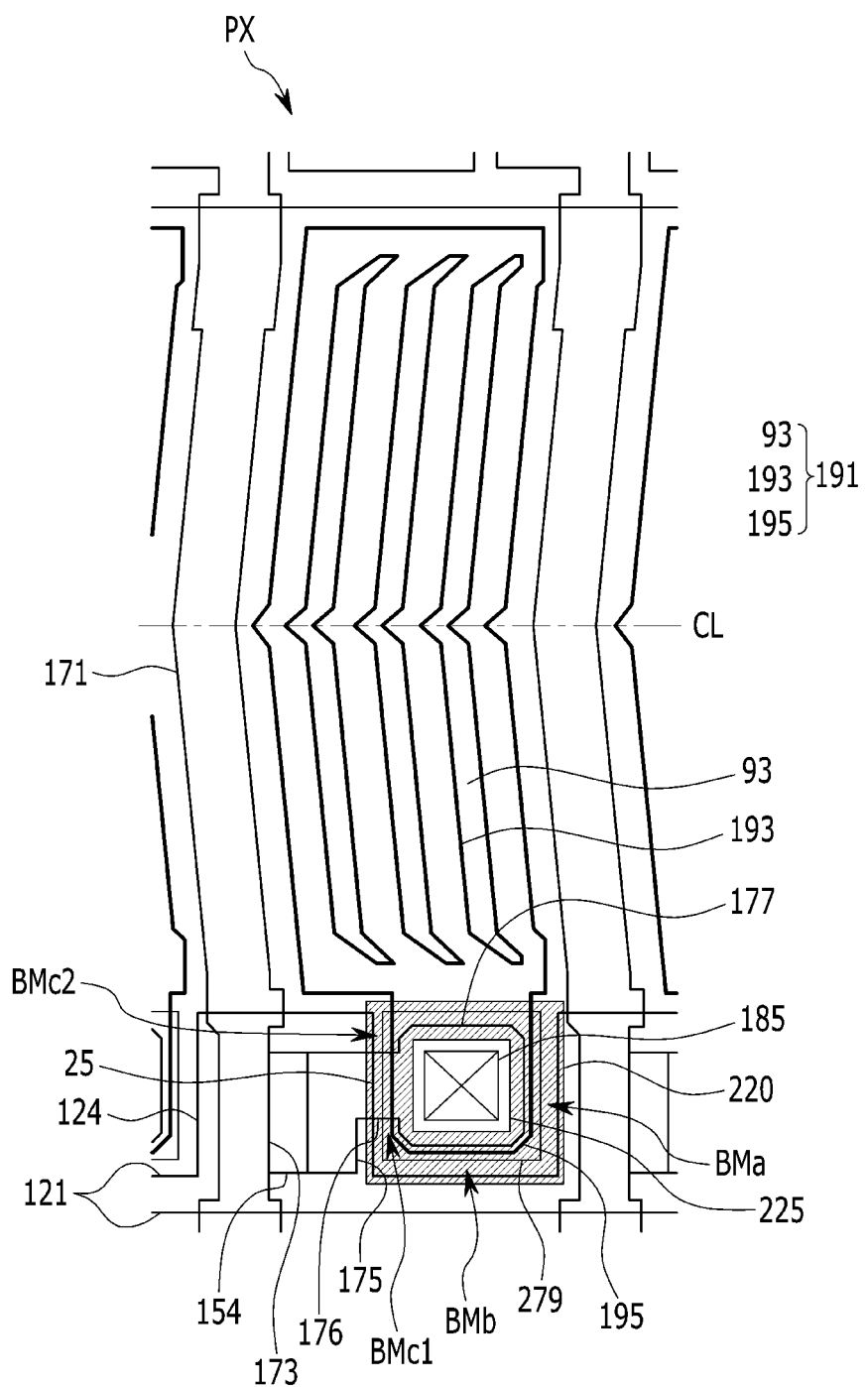
Figure 19:
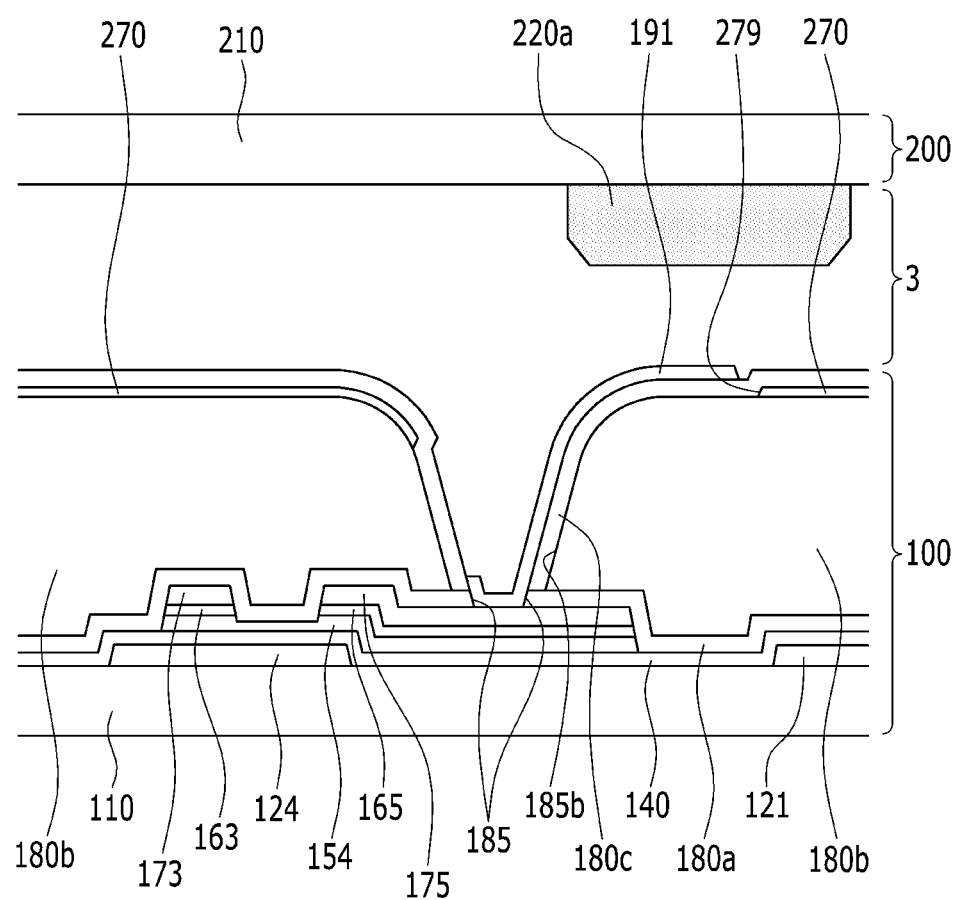
FIGS. 19 and 20 are a cross-sectional view of the LCD shown in FIG. 14 taken along line XV-XV.
Figure 20:
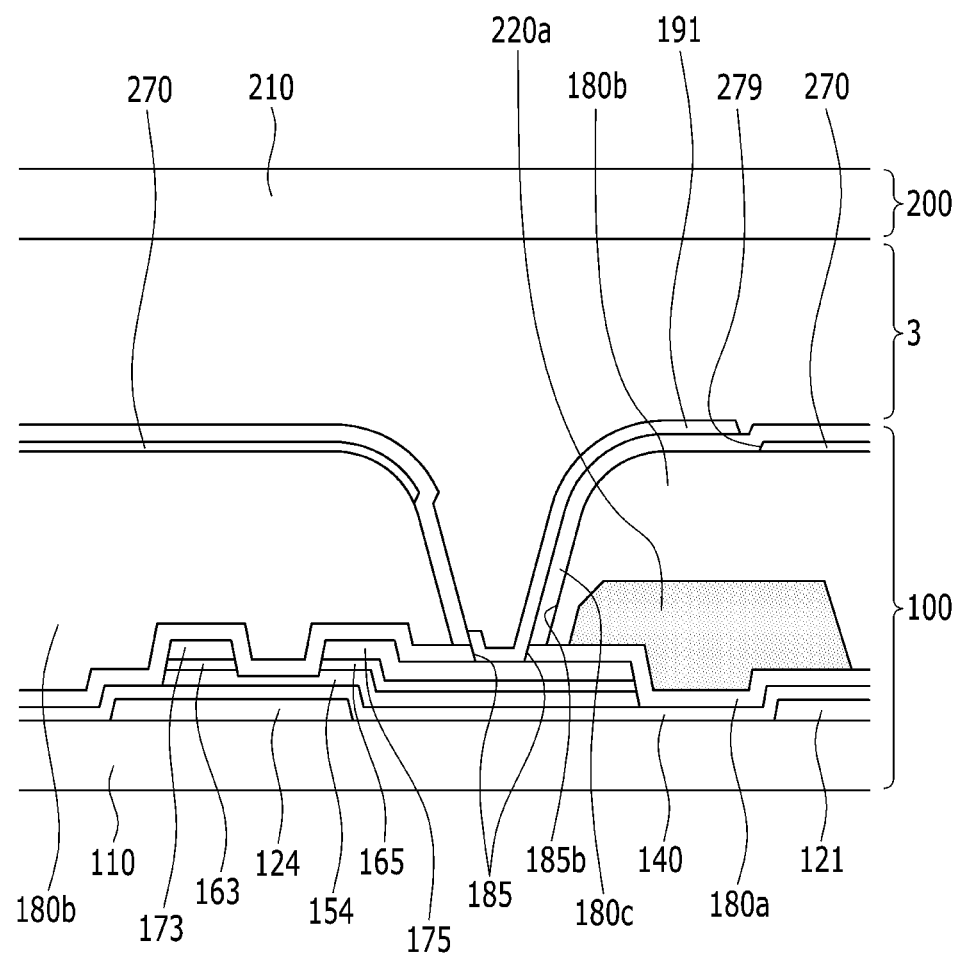

FIGS. 16 to 18 are plan views of a pixel of an LCD according to an exemplary embodiment of the invention, and FIGS. 19 and 20 are cross-sectional views of the LCD shown in FIG. 14 taken along line XV-XV.

The LCD according to the illustrated exemplary embodiment is the same as most of the exemplary embodiment shown in FIGS. 14 and 15, but a shape of the light blocking member may be different.

Referring to FIG. 16, the LCD according to an exemplary embodiment of the invention includes the island light blocking member 220 positioned corresponding to one pixel PX. The light blocking member 220 may overlap and cover all of the first light leakage portion BMa, the second light leakage portion BMb, the lower third light leakage portion BMc1, and the upper third light leakage portion BMc2 near the recess portion 25 of the gate line 121, as described above. Accordingly, the light blocking member 220 includes three bar portions connected to each other. The light blocking member 220 may block light leakage caused by the fringe field between the gate line 121 and the drain electrode 175 or the pixel electrode 191.

Referring to FIG. 17, the LCD according to an exemplary embodiment of the invention includes the island light blocking member 220 positioned corresponding to one pixel PX. The light blocking member 220 according to the illustrated exemplary embodiment may also overlap and cover the recess portion 25 of the gate line 121 enclosed by the first light leakage portion BMa, the second light leakage portion BMb, the lower third light leakage portion BMc1, and the upper third light leakage portion BMc2 as well as the first light leakage portion BMa, the second light leakage portion BMb, the lower third light leakage portion BMc1, and the upper third light leakage portion BMc2. Accordingly, the light blocking member 220 may be an approximate convex polygon in a plan view, for example, a convex quadrangle. However, the shape of the light blocking member 220 is not limited thereto, and any shape covering the recess portion 25 of the gate line 121 is possible.

Referring to FIG. 18, the LCD according to an exemplary embodiment of the invention includes the island light blocking member 220 positioned corresponding to one pixel PX. The light blocking member 220 according to the illustrated exemplary embodiment is the same as most of the exemplary embodiment shown in FIG. 17, but an opening 225 defined at the center of the light blocking member 220 may be further included. The opening 225 may overlap the expansion 177. Accordingly, the light blocking member 220 may have a donut shape of the approximate convex polygon in a plan view, for example, the donut shape of the convex quadrangle. The light blocking member 220 according to the illustrated exemplary embodiment may overlap the upper edge portion of the recess portion 25. However, the shape of the light blocking member 220 is not limited thereto, and any shape covering the edge portion of the recess portion 25 of the gate line 121 such as the looped curved line is possible.

Referring to FIG. 19, in the various exemplary embodiments of FIGS. 14 to 18, the light blocking members 220, 220a, and 220b may be positioned on the substrate 210 of the upper panel 200.

Referring to FIG. 20, in the several exemplary embodiments shown in FIGS. 14 to 18, the light blocking members 220, 220a, and 220b may be positioned under the pixel electrode 191, and in detail, between the first passivation layer 180a and the second passivation layer 180b.

Next, the LCD according to the exemplary embodiment of the invention will be described with reference to FIGS. 21 to 25 together with the aforementioned drawings.

Figure 21:
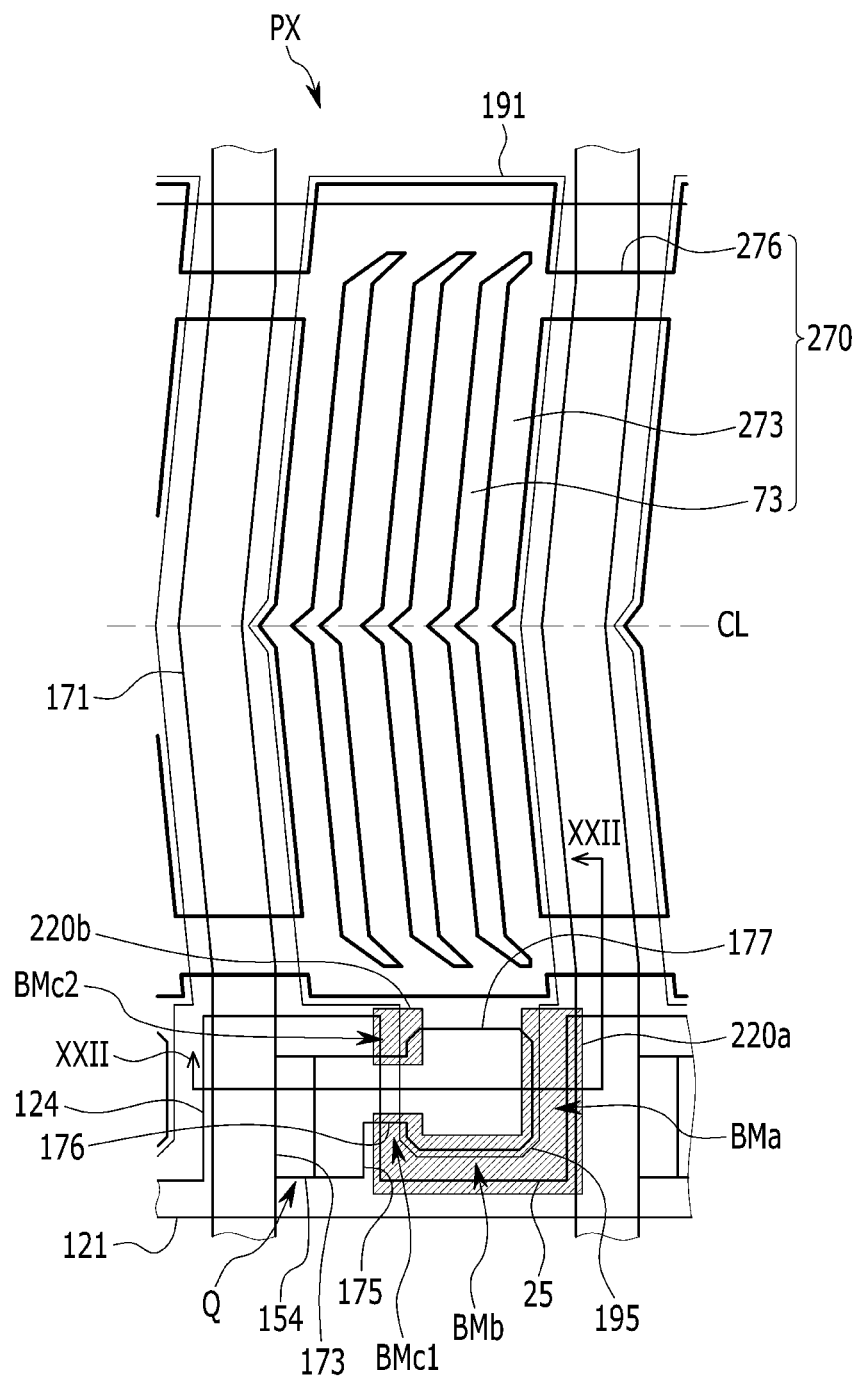
FIG. 21 is a plan view of an exemplary embodiment of a pixel of an LCD according to the invention, FIG. 22 a cross-sectional view of the LCD shown in FIG. 21 taken along line XXII-XXII.
Figure 22:
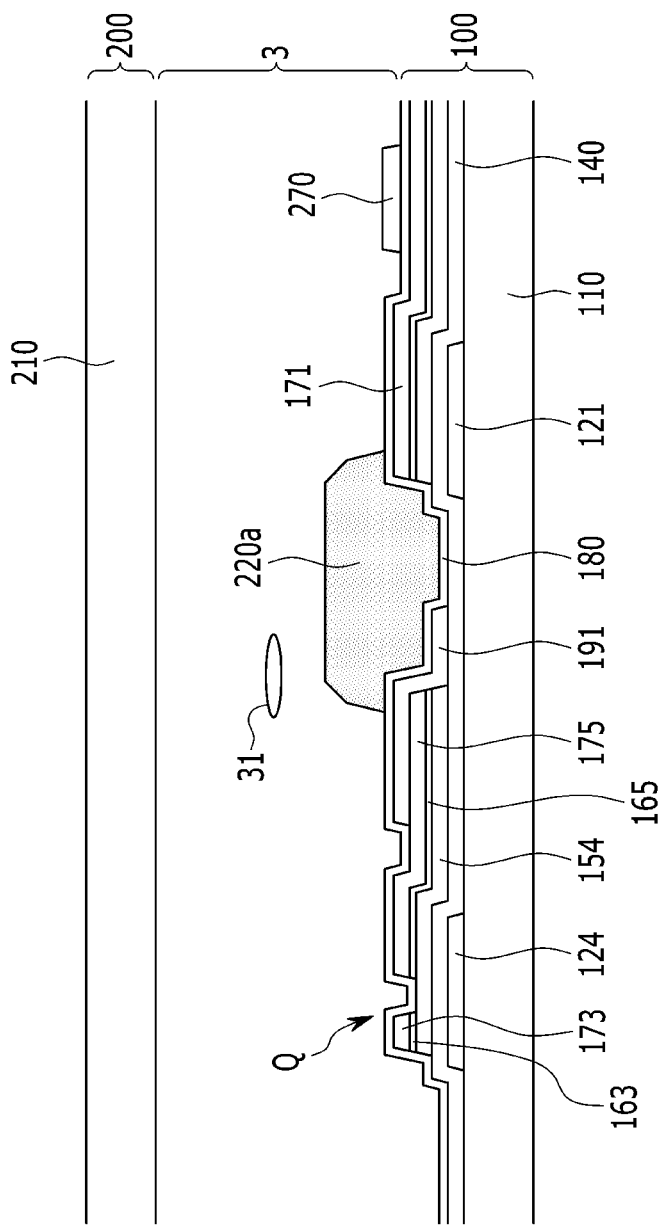
Figure 23:
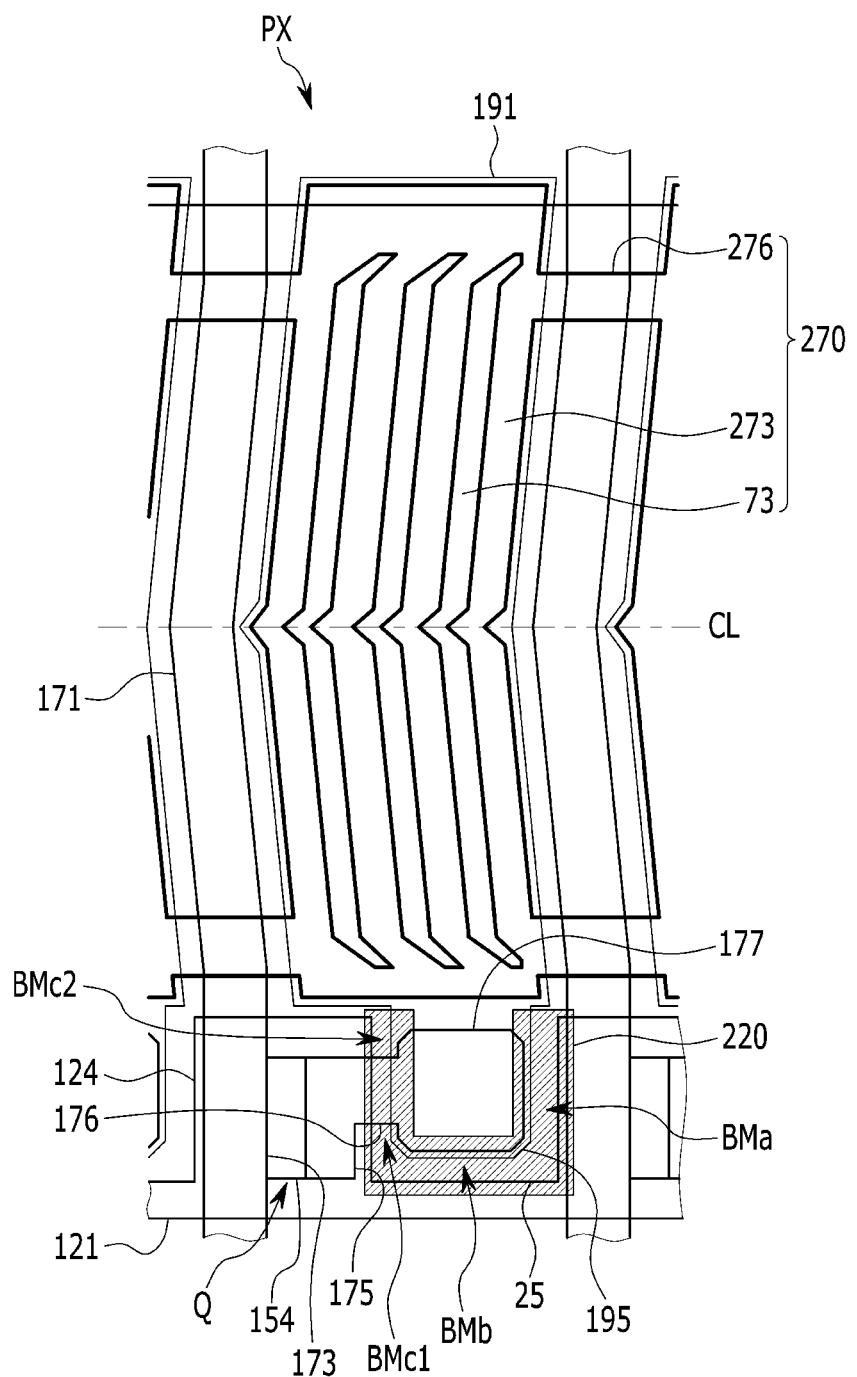
FIGS. 23 to 28 are plan views of an exemplary embodiment of a pixel of an LCD according to the invention.
Figure 24:
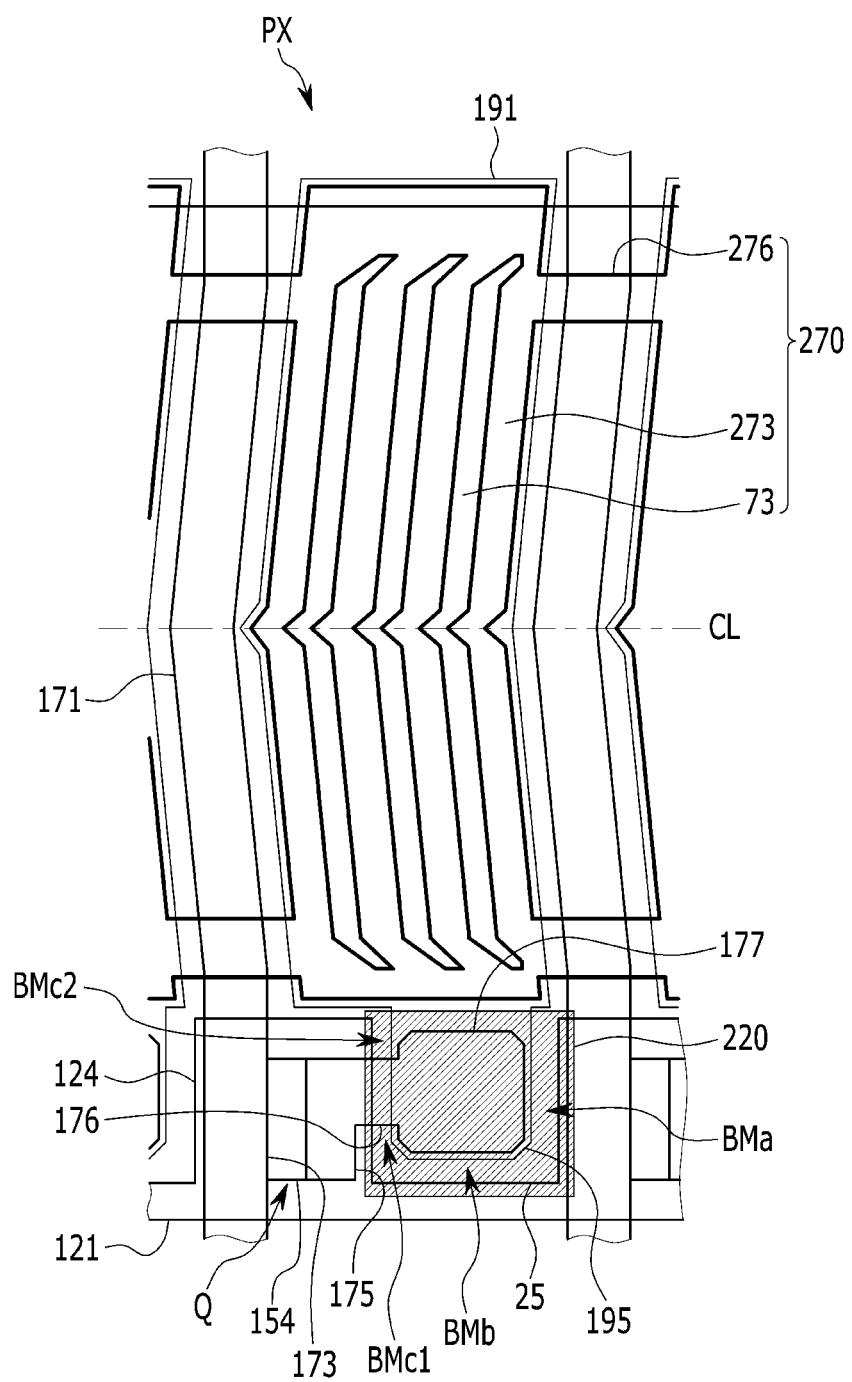
Figure 25:
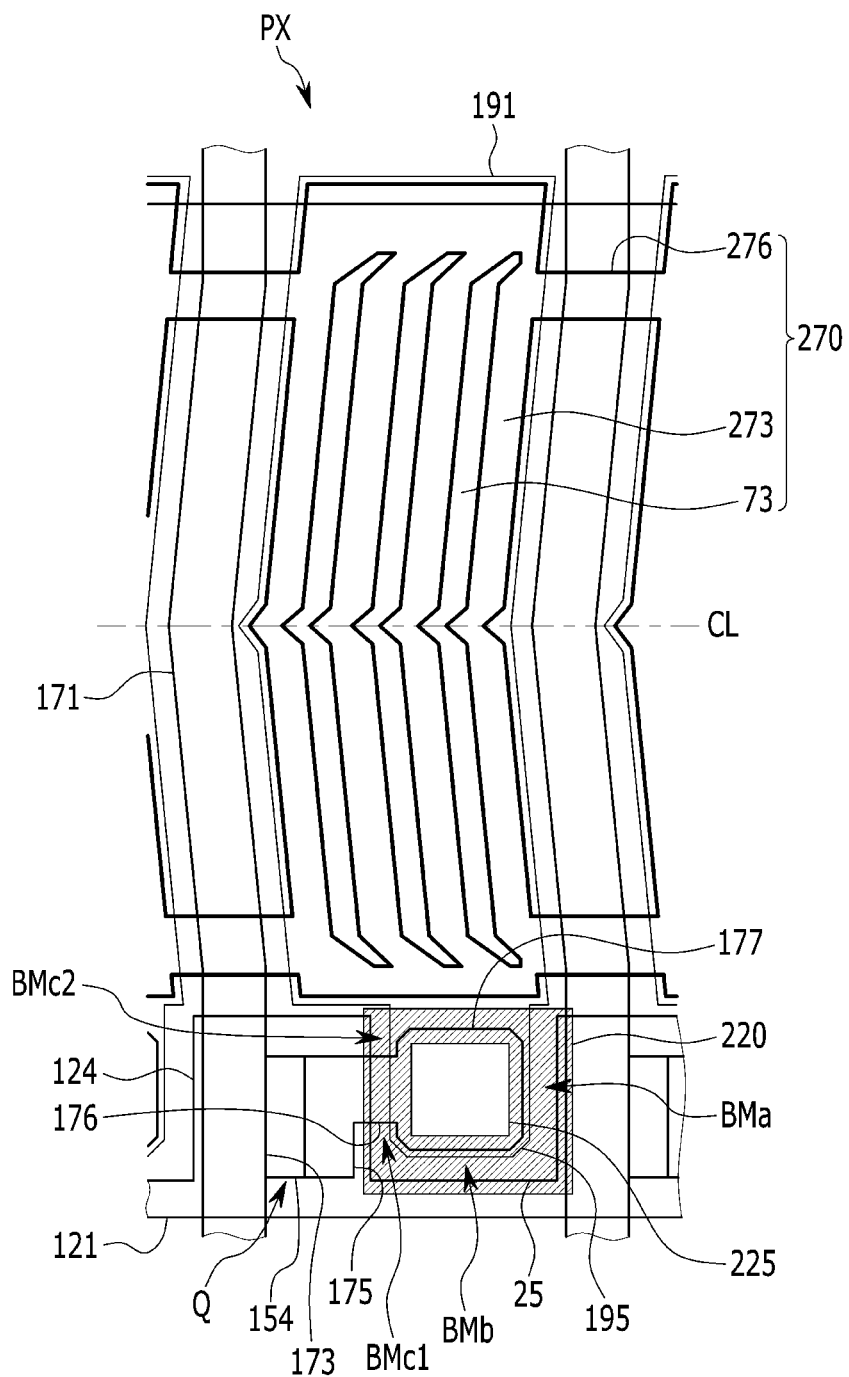

FIG. 21 is a plan view of a pixel of an LCD according to an exemplary embodiment of the invention, FIG. 22 is a cross-sectional view of the LCD shown in FIG. 21 taken along line XXII-XXII, and FIGS. 23 to 25 are plan views of a pixel of an LCD according to an exemplary embodiment of the invention.

The LCD according to the illustrated exemplary embodiment is substantially the same as the above described exemplary embodiment, but the deposition position of the pixel electrode 191 and the opposing electrode 270 may be different.

Referring to FIGS. 21 and 22, in the lower panel 100, the gate conductor including the gate line 121 is disposed on the substrate 110, the gate insulating layer 140 is disposed thereon, and the semiconductor 154 is positioned thereon. The ohmic contacts 163 and 165 may be positioned on the semiconductor 154. The data conductor including the data line 171 including the source electrode 173 and the drain electrode 175 is disposed on the ohmic contacts 163 and 165 and the gate insulating layer 140.

The pixel electrode 191 may be positioned directly on the drain electrode 175. That is, the pixel electrode 191 may directly contact the drain electrode 175. In an alternative exemplary embodiment, an insulating layer may be positioned between the drain electrode 175 and the pixel electrode 191. In this case, the pixel electrode 191 may be connected to the drain electrode 175 through the contact hole of the insulating layer. The pixel electrode 191 may be disposed in one pixel PX, and have the plane shape in a plan view, that is, a single plate shape.

The passivation layer 180 is positioned on the data conductor, the gate insulating layer 140, the exposed portion of the semiconductor 154, and the pixel electrode 191.

The opposing electrode 270 is positioned on the passivation layer 180. The opposing electrodes 270 respectively positioned in a plurality of pixels PX is connected with each other through a connection bridge 276 and the like to transfer the same common voltage. The opposing electrodes 270 according to the exemplary embodiment include a plurality of branch electrodes 273 overlapped with the pixel electrode 191 of a plane shape. A slit 73 where the electrode is removed is defined between the adjacent branch electrodes 273 of the opposing electrode 270.

Referring to FIG. 21, in the illustrated exemplary embodiment, the first light blocking member 220a overlaps and covers the first light leakage portion BMa, the second light leakage portion BMb, and the lower third light leakage portion BMc1 at one time, and the second light blocking member 220b separated from the first light blocking member 220a may overlap the upper third light leakage portion BMc2. Accordingly, since all light leakage portions BMa, BMb, BMc1, and BMc2 overlap the first light blocking member 220a and the second light blocking member 220b, the light leakage caused by the fringe field between the gate line 121 and the drain electrode 175 or the pixel electrode 191 may be blocked. The rest of the descriptions are the same as those of the described exemplary embodiments such that the detailed description is omitted.

Referring to FIGS. 21 and 22, the light blocking members 220a and 220b may be positioned at the lower panel 100. In detail, a height of the light blocking members 220a and 220b may be higher than that of the opposing electrode 270 in a cross section. However, the position of the light blocking members 220a and 220b is not limited thereto, and like the exemplary embodiment shown in FIGS. 9 and 10, it may be variously changed.

Referring to FIG. 23, the island light blocking member 220 positioned corresponding to one pixel PX may overlap and cover the first light leakage portion BMa, the second light leakage portion BMb, the lower third light leakage portion BMc1, and the upper third light leakage portion BMc2 near the recess portion 25 of the gate line 121. Accordingly, the light blocking member 220 includes three bar portions connected to each other. The light blocking member 220 may block the light leakage caused by the fringe field between the gate line 121 and the drain electrode 175 or the pixel electrode 191.

Referring to FIG. 24, the island light blocking member 220 positioned corresponding to one pixel may also overlap and cover the recess portion 25 of the gate line 121 enclosed by the first light leakage portion BMa, the second light leakage portion BMb, the lower third light leakage portion BMc1, and the upper third light leakage portion BMc2. Accordingly, the light blocking member 220 may be an approximate convex polygon in a plan view, for example, a convex quadrangle. However, the shape of the light blocking member 220 is not limited thereto, and any shape covering the recess portion 25 of the gate line 121 is possible.

Referring to FIG. 25, the island light blocking member 220 positioned corresponding to one pixel PX is the same as most of the exemplary embodiment shown in FIG. 24, but an opening 225 defined at the center of the light blocking member 220 may be further included. Accordingly, the light blocking member 220 may have a donut shape of the approximate convex polygon in a plan view, for example, the donut shape of the convex quadrangle. The light blocking member 220 according to the illustrated exemplary embodiment may overlap the upper edge portion of the recess portion 25. However, the shape of the light blocking member 220 is not limited thereto, and any shape covering the edge portion of the recess portion 25 of the gate line 121 such as the looped curved line is possible.

Next, the LCD according to the exemplary embodiment of the invention will be described with reference to FIGS. 26 to 28 together with the aforementioned drawings.

Figure 26:
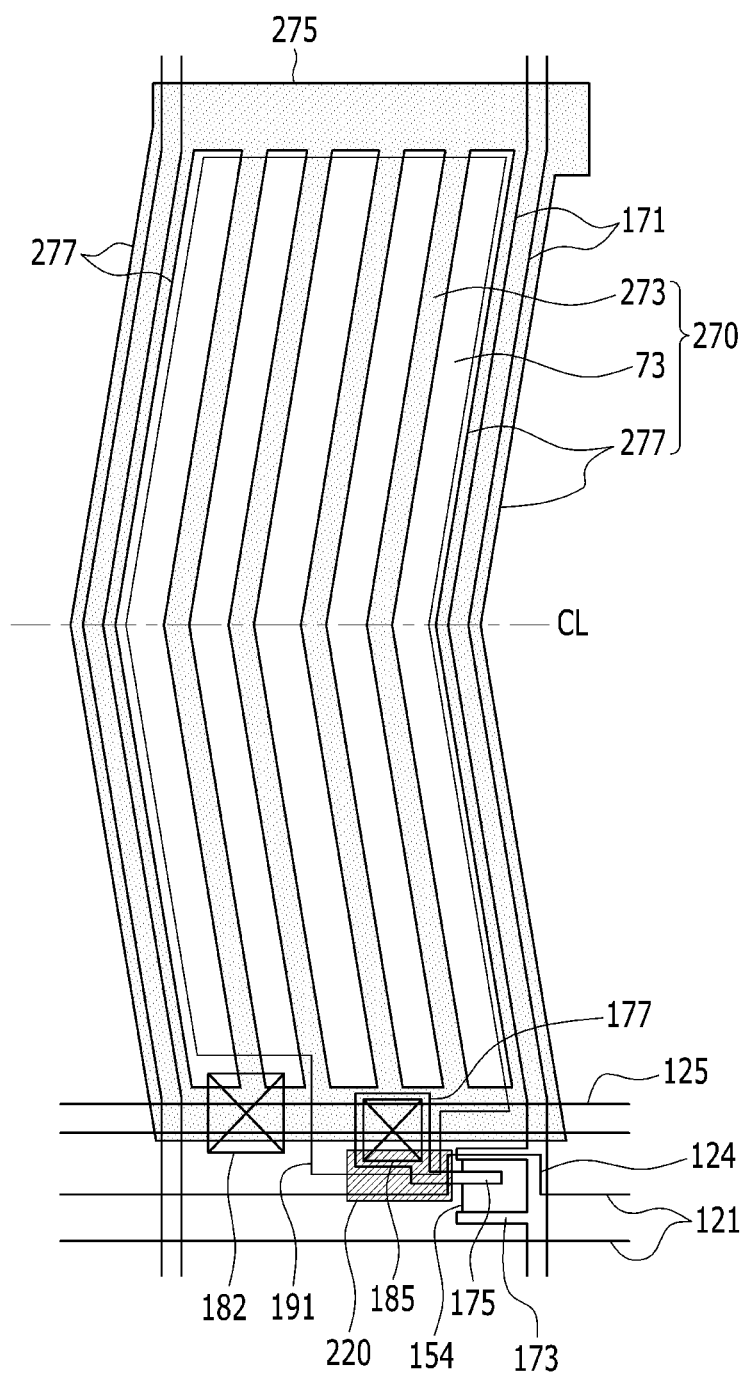
Figure 27:
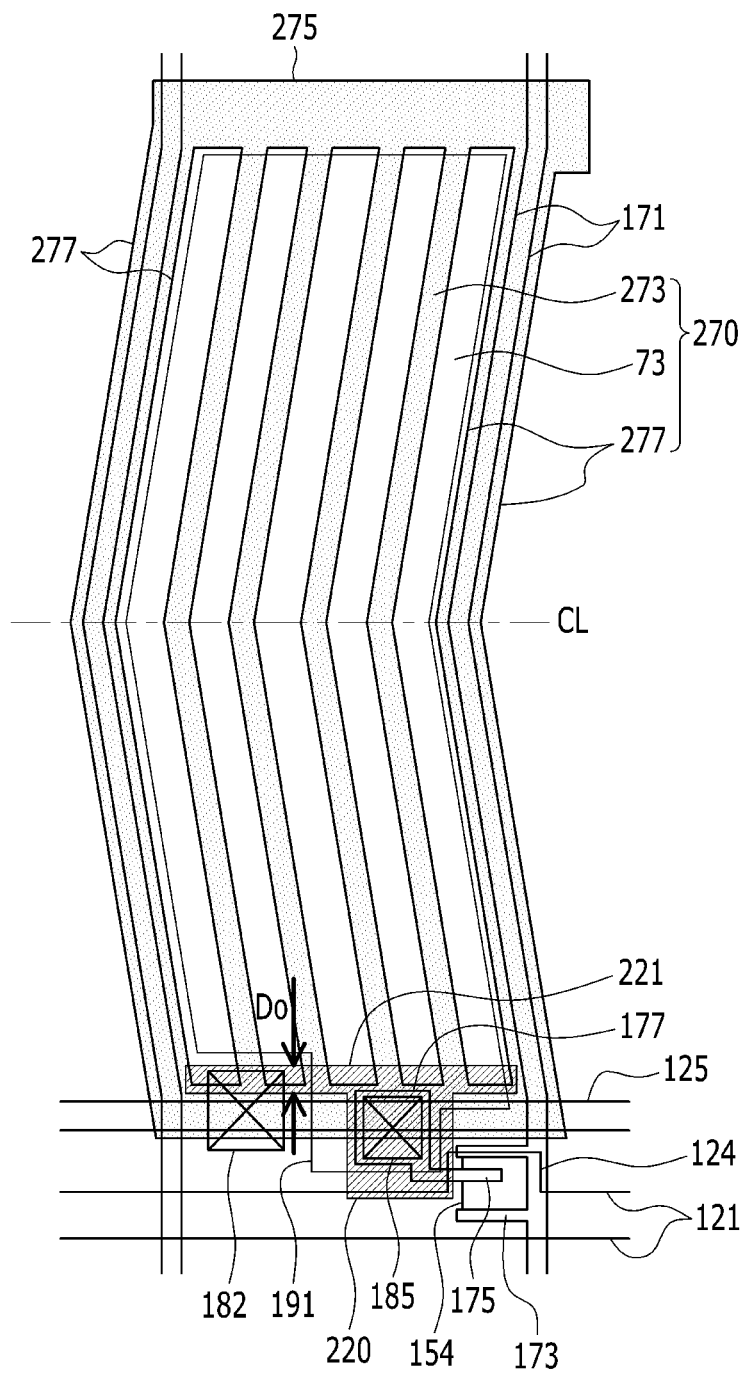
Figure 28:
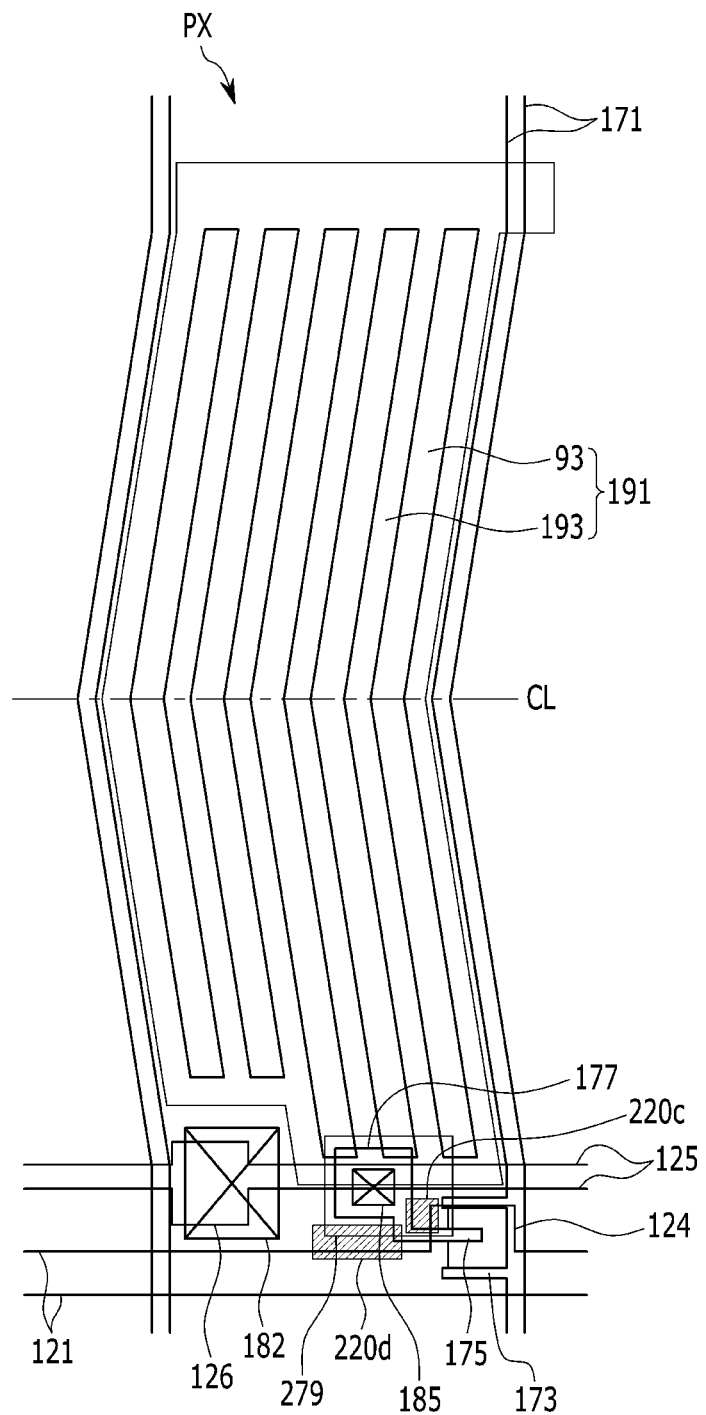

FIGS. 26 to 28 are plan views of a pixel of an LCD according to an exemplary embodiment of the invention.

Referring to FIG. 26, the LCD according to the illustrated exemplary embodiment is substantially the same as the exemplary embodiment shown in FIGS. 21 to 25 such that the same description is omitted.

The LCD according to the illustrated exemplary embodiment may further include a common voltage line 125 positioned on and/or in the same layer as the gate line 121. The gate line 121 includes a gate electrode 124 protruding upwardly or downwardly in a plan view.

The pixel electrode 191 may be connected to the drain electrode 175 through a contact hole 185 of a passivation layer (not shown) positioned on the drain electrode 175.

The data line 171 may be bent at a horizontal center line CL.

The pixel electrode 191 may have the plane shape with sides approximately parallel to the gate line 121 and the data line 171, respectively.

At least one insulating layer (not shown) may be positioned on the pixel electrode 191, and the opposing electrode 270 may be positioned thereon. A contact hole 182 exposing a portion of the common voltage line 125 may be defined in the at least one insulating layers such as the passivation layer positioned between the common voltage line 125 and the opposing electrode 270.

The opposing electrode 270 positioned at each pixel PX may include a longitudinal portion 277 covering the data line 171, a plurality of branch electrodes 273 positioned between two longitudinal portions 277 and separated from each other, and a connection 275 connecting ends of a plurality of branch electrodes 273. The opposing electrode 270 may be applied with the common voltage from the common voltage line 125 through the contact hole 182.

The LCD according to the illustrated exemplary embodiment may include an island light blocking member 220 overlapping the space between the side of the gate line 121 and the side of the expansion 177 of the drain electrode 175 facing each other. The light blocking member 220 may cover at least one of the side of the gate line 121 and the side of the expansion 177 of the drain electrode 175.

Referring to FIG. 27, an LCD according to an exemplary embodiment is substantially the same as the exemplary embodiment shown in FIG. 26, but the light blocking member 220 may be enlarged to further include a transverse portion 221 covering end portions of at least one slit 73 between the branch electrodes 273. The width Do in the longitudinal direction of the slit 73 that overlaps the transverse portion 221 of the light blocking member 220 may be about 1 micrometer (µm) to about 5 µm. As such, since the light blocking member 220 overlaps the end portion of the slit 73, bruising, which may be generated due to liquid crystal molecules that cannot return to the initial state even after an external pressure is removed, especially bruising around the end portion of the slit 73, may be prevented from being observed.

The light blocking member 220 may cover the contact hole 185 as well.

Referring to FIG. 28, the LCD according to the illustrated exemplary embodiment is substantially the same as the exemplary embodiment shown in FIG. 26, but the deposition position of the pixel electrode 191 and the opposing electrode 270 may be exchanged. In this case, the opposing electrode (not shown) may have the plane shape filling most of the region of the pixel PX, and the pixel electrode 191 may include a plurality of branch electrodes 193 overlapping the opposing electrode, and slits 93 may be defined therebetween. Further, the common voltage line 125 may include an expansion 126. The opposing electrode may be connected to the common voltage line 125 through the contact hole 182 exposing the expansion 126 of the common voltage line 125.

The LCD according to the illustrated exemplary embodiment may include an island light blocking member 220c overlapping the space between the side of the gate electrode 124 and the side of the expansion 177 of the drain electrode 175 and an island light blocking member 220d overlapping the space between the side of the gate line 121 and the side of the expansion 177 of the drain electrode 175. The two light blocking members 220c and 220d may be separated from each other with the island shape in a plan view or may be connected to each other. The light blocking member 220c may also cover at least one of the side of the gate electrode 124 and the side of the expansion 177 of the drain electrode 175 facing each other, and the light blocking member 220d may also cover at least one of the side of the gate line 121 and the side of the expansion 177 of the drain electrode 175 facing each other.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display comprising:
   a first substrate including a plurality of pixels;
   a gate line which is disposed on the first substrate and transmits a gate signal;
   a data line which is disposed on the first substrate and crossing the gate line;
   a transistor including a gate electrode connected to the gate line, a source electrode connected to the data line, and a drain electrode opposing the source electrode;
   an insulating layer disposed on the source electrode and the drain electrode, the insulating layer having a contact hole on the drain electrode; and
   a light blocking member which overlaps a space between a side of at least one of the gate line and the gate electrode, and a side of the drain electrode, which face each other,
   wherein the light blocking member has an island shape within a region of a pixel of the plurality of pixels in a plan view, and
   the light blocking member is not disposed at an area where the gate line and the data line overlap each other, and the light blocking member does not overlap the source electrode and the contact hole in the plan view.

2. The liquid crystal display of claim 1, wherein
   the light blocking member further overlaps a space between the side of the at least one of the gate line and the gate electrode, and a side of a pixel electrode connected to the drain electrode.

3. The liquid crystal display of claim 2, wherein
   a recess portion is defined in the gate line,
   the drain electrode includes an expansion disposed in the recess portion, and
   the pixel electrode includes a protrusion electrically connected to the expansion.

4. The liquid crystal display of claim 3, wherein
   the light blocking member includes a first light blocking member portion overlapping at least one of a space between an edge side of the recess portion and a side of the expansion which face each other and a space between an edge side of the recess portion and a side of the protrusion which face each other.

5. The liquid crystal display of claim 4,
   the drain electrode further includes a bar portion facing the source electrode, and a connection which connects the bar portion and the expansion,
   the light blocking member further includes a second light blocking member portion facing the first light blocking member portion via the connection interposed therebetween, and
   the second light blocking member portion overlaps at least one of a space between the edge side of the recess portion and the side of the expansion which face each other and a space between the edge side of the recess portion and the side of the protrusion which face each other.

6. The liquid crystal display of claim 5, wherein
   the first light blocking member portion and the second light blocking member portion are connected to each other.

7. The liquid crystal display of claim 5, wherein
   the light blocking member is disposed on the pixel electrode.

8. The liquid crystal display of claim 5, wherein
   the light blocking member is disposed between the pixel electrode and the first substrate.

9. The liquid crystal display of claim 5, further comprising:
   a second substrate facing the first substrate; and
   a liquid crystal layer between the first substrate and the second substrate,
   wherein the light blocking member is disposed between the liquid crystal layer and the second substrate.

10. The liquid crystal display of claim 3, wherein
    the light blocking member overlaps at least one of a space between an edge side of the recess portion and a side of the expansion which face each other and a space between an edge side of the recess portion and a side of the protrusion which face each other, and overlaps the expansion.

11. The liquid crystal display of claim 10, wherein
an opening is defined at a center of the light blocking member and overlaps the expansion.

12. The liquid crystal display of claim 10, wherein
the light blocking member is disposed on the pixel electrode.

13. The liquid crystal display of claim 10, wherein
the light blocking member is disposed between the pixel electrode and the first substrate.

14. The liquid crystal display of claim 10, further comprising:
a second substrate facing the first substrate; and
a liquid crystal layer between the first substrate and the second substrate,
wherein the light blocking member is disposed between the liquid crystal layer and the second substrate.

15. The liquid crystal display of claim 3, further comprising
an opposing electrode which receives a common voltage and generates an electric field in the liquid crystal layer along with the pixel electrode,
wherein the opposing electrode is disposed on the first substrate.

16. The liquid crystal display of claim 15, wherein
an opening is defined in the opposing electrode, wherein the opening surrounds the protrusion, and
the light blocking member includes a portion overlapping at least one of a space between an edge side of the opening and an edge side of the expansion which face each other and a space between an edge side of the opening and an edge side of the protrusion which face each other.

17. The liquid crystal display of claim 2, wherein
the light blocking member overlaps at least one of a space between an edge side of the gate line and the side of the drain electrode which face each other and a space between an edge side of the gate line and the side of the pixel electrode which face each other.

18. The liquid crystal display of claim 2, wherein
the gate electrode protrudes upwardly or downwardly in the plan view from the gate line, and
the light blocking member overlaps at least one of a space between an edge side of the gate electrode and the side of the drain electrode which face each other and a space between an edge side of the gate electrode and the side of the pixel electrode which face each other.

19. The liquid crystal display of claim 18, wherein
the light blocking member is disposed on the pixel electrode.

20. A liquid crystal display comprising:
a first substrate including a plurality of pixels;
a gate line which is disposed on the first substrate and transmits a gate signal;
a data line which is disposed on the first substrate and crossing the gate line;
a transistor including a gate electrode which is a portion of the gate line, a source electrode connected to the data line, and a drain electrode opposing the source electrode; and
a light blocking member which overlaps a space between a first side of the gate line and a second side of the drain electrode in a plan view, the first side and the second side extending substantially parallel to each other interposing the space between the first side and the second side in the plan view,
wherein the light blocking member has an island shape within a region of a pixel of the plurality of pixels in the plan view,
the light blocking member is not disposed at an area where the gate line and the data line overlap each other, and
the light blocking member overlaps an entire width of the space in a direction perpendicular to an extending direction of the first side or the second side.

* * * * *